US008374996B2

(12) United States Patent
Strumpf et al.

(10) Patent No.: US 8,374,996 B2
(45) Date of Patent: *Feb. 12, 2013

(54) MANAGING MEDIA CONTACT AND CONTENT DATA

(75) Inventors: Kurt Strumpf, Monroe, CT (US); Jon Victor, New Canaan, CT (US)

(73) Assignee: eNR Services Inc., New Canaan, CT (US)

( * ) Notice: Subject to any disclaimer, the term of this patent is extended or adjusted under 35 U.S.C. 154(b) by 323 days.

This patent is subject to a terminal disclaimer.

(21) Appl. No.: 12/633,552

(22) Filed: Dec. 8, 2009

(65) Prior Publication Data

US 2010/0174748 A1      Jul. 8, 2010

Related U.S. Application Data

(63) Continuation-in-part of application No. 12/605,998, filed on Oct. 26, 2009, and a continuation-in-part of application No. 11/257,279, filed on Oct. 24, 2005.

(60) Provisional application No. 61/197,205, filed on Oct. 24, 2008, provisional application No. 60/627,666, filed on Nov. 12, 2004, provisional application No. 60/645,858, filed on Jan. 20, 2005.

(51) Int. Cl.
*G06F 17/30* (2006.01)

(52) U.S. Cl. .......................... 707/603; 707/602; 707/804

(58) Field of Classification Search ........................ None
See application file for complete search history.

(56) References Cited

U.S. PATENT DOCUMENTS

| | | | |
|---|---|---|---|
| 5,819,092 A | 10/1998 | Ferguson et al. | |
| 5,832,499 A | 11/1998 | Gustman | |
| 6,038,573 A | 3/2000 | Parks | |
| 6,092,080 A | 7/2000 | Gustman | |
| 6,173,287 B1 | 1/2001 | Eberman et al. | |
| 6,353,831 B1 | 3/2002 | Gustman | |
| 6,618,727 B1 | 9/2003 | Wheeler et al. | |
| 7,716,251 B2 | 5/2010 | Chang et al. | |
| 2002/0120635 A1* | 8/2002 | Joao .............................. 707/200 |
| 2002/0152245 A1 | 10/2002 | McCaskey et al. | |
| 2004/0179102 A1 | 9/2004 | Matsufune | |
| 2005/0149538 A1* | 7/2005 | Singh et al. ................... 707/100 |
| 2010/0287458 A1 | 11/2010 | Guller et al. | |

OTHER PUBLICATIONS

Non-final Office Action mailed Apr. 13, 2011 in U.S. Appl. No. 11/257,279, 34 pages.
Final Office Action mailed Aug. 5, 2011 in U.S. Appl. No. 11/257,279, 43 pages.

* cited by examiner

*Primary Examiner* — Syed Hasan
(74) *Attorney, Agent, or Firm* — Fish & Richardson, P.C.

(57) ABSTRACT

An indication of a topic of interest is received. Multiple pieces of content are accessed, and the indication of the topic of interest is compared to the pieces of content. Based on comparing the indication of the topic of interest to the pieces of content, a piece of content is identified as being relevant to the topic of interest. An identifier is identified for an author of the piece of content. Contact information for each of multiple authors including identifiers therefor is accessed, and the identifier for the author is compared to the identifiers included in the contact information. Based on results of comparing the identifier for the author to the identifiers included in the contact information, contact information corresponding to the author is identified. Thereafter, an indication of the identity of the author and at least some of the identified contact information corresponding to the author is returned.

21 Claims, 26 Drawing Sheets

Matchpoint

| | |
|---|---|
| Journalist: | Marin Perez —154 |
| Media Outlet: | Information Week —156 |
| Address: | 600 Community Drive |
| 158— | Manhasset, NY 11030 |
| Title: | Associate Editor, Mobile, wireless, smartphones —160 |
| eMail: | mperez@techweb.com —162 |
| Telephone: | (415) 947-6734 —164 |
| Fax: | (516) 562-5036 |

| | Headline | Date —166 | Source |
|---|---|---|---|
| ☒ | Android phone —122 | 9/12/2009 12:00 AM | Information Week |
| ☒ | Microsoft Windows Mobile 6.5 To Launch In October | 9/1/2009 12:00 AM | Information Week |
| ☒ | Thoughts On The Sony Ericsson C905a | 8/13/2009 12:00 AM | Information Week |
| ☒ | Palm Posts $105 Million Loss | 6/26/2009 12:00 AM | Information Week |
| | Apple's iPhone 3G S Paces Summer Of Smartphones | 6/9/2009 12:00 AM | Information Week |
| | Apple Defends App Store Approval Process | 11/23/2009 12:00 AM | Information Week |
| | Thoughts On The Motorola Droid | 11/21/2009 12:00 AM | Information Week |
| | Cisco Rolls Out iPhone Security App | 11/21/2009 12:00 AM | Information Week |
| | Verizon's Droid has Camera Issues | 11/18/2009 12:00 AM | Information Week |
| | CTIA Seeks More Mobile Broadband Spectrum —122 | 11/17/2009 12:00 AM | Information Week |
| | Sprint Lights Up WiMax in Texas | 11/16/2009 12:00 AM | Information Week |
| | Thoughts On The Blackberry Bold 9700 —122 | 11/13/2009 12:00 AM | Information Week |
| | Check Out The Xobni App For BlackBerry —122 | 11/12/2009 12:00 AM | Information Week |
| | Femtocells Struggle To Catch On | 11/12/2009 12:00 AM | Information Week |
| | Smartphones Sales Continue To Rise | 11/11/2009 12:00 AM | Information Week |
| | RIM, Adobe team For BlackBerry Development | 11/9/2009 12:00 AM | Information Week |
| | T-Mobile Sees Dip in Subscribers —122 | 11/6/2009 12:00 AM | Information Week |
| | Verizon To Raise Termination Fees | 11/6/2009 12:00 AM | Information Week |
| | VoiceCon 2009: Avoid Unified Communications Hype | 11/5/2009 12:00 AM | Information Week |

FIG. 1D

```
<article id="_2269303426">
 <description charset="UTF-8" language="English">
 <hltext_display><![CDATA[Possession key for Revs against Fire]]></hltext_display>
 <author><![CDATA[Kyle McCarthy]]></author>

<content><![CDATA[Nicol hoping to translate club's quality in training to game action Jeff Larentowicz will be key to the Revs' plans against Chicago Saturday. (K. Nordstrom/
Getty)

FOXBOROUGH, Mass. -- New England Revolution coach Steve Nicol pointed to his side's
lack of quality on the evening as one of the principal reasons for last Saturday's 1-0 defeat to
Columbus.
 .
 .
 .

'This morning was great,' Nicol said. 'We couldn't have been happier with how we passed it and
how everybody is moving around. It was fantastic. That's why we shut it down early. We need
to translate that into the game.']]></content>
 </description>

<url>http://c.moreover.com/click/here.pl?z2269303426&z=950241838</url>
 <source>Major League Soccer</source>
 <source_category>General</source_category>
 <media_type>text</media_type>
 <docurl>http://web.mlsnet.com</docurl>
 <harvest_time>Oct 16 2009 3:36AM</harvest_time>
 <valid_time>Nov 25 2009 3:33AM</valid_time>
 <rank>
        <source_rank>3</source_rank>
        <web_rank></web_rank>
        <order_rank>29</order_rank>
 </rank>
 <location>
        <region>AMERICAS</region>
        <subregion>NORTHERN AMERICA</subregion>
        <country>UNITED STATES</country>
         <state></state>
 </location>
</article>
```

FIG. 5

| Field Name | Type | Description |
| --- | --- | --- |
| Map_id | Auto | Unique Identifier |
| Content_source | Char(32) | Feed Source |
| Outlet | Char(64) | Name of Outlet |
| Outlet_id | Integer | site id in MCD |
| Has_articles | Boolean | Flag set if source has current articles |
| Date_inserted | DateTime | Date map entry created |
| State_code | Char(2) | State (for geo filter) |

FIG. 7

| Field Name | Type | Description |
| --- | --- | --- |
| Map_id | Auto | Unique Identifier |
| Outlet_map_id | Integer | Link to outlet map table |
| Journalist | Char(64) | Byline |
| Journalist_id | Int | Editor id in MCD |
| Date_inserted | DateTime | Date Map entry Created |

FIG. 8

```
<add>
<doc>
<field name="id">87030072</field>
<field name="content_date">2009-11-12T00:00:00.000Z</field>
<field name="media_type">Blogs</field>
<field name="location"></field>
<field name="country_code">US</field>
<field name="text"><![CDATA[Small Business Credit Card – Keeping Business and Personal
Separate Author: Robert Alan
Source: articleage.com It can be a claiming for baby businesses to access the able funds they charge to set up boutique
and/or to accumulate it active smoothly. It is aswell difficult to accumulate business and
claimed accounts abstracted and to body business credit. As a new business owner, a baby
business acclaim agenda ability be just the affair you need. If you accept an accustomed
business, than a business acclaim agenda may be a acceptable way for you to administer your
banknote breeze or accommodate emergency funds if your money gets tight.

.
.
.

Article Source: http://EzineArticles.com/?expert=Robert_Alan
enrjournalist staceykhart211 enroutlet Caribbean blogs - Cariblogger]]></field>
<field name="content_source">moreoverblogs</field>
<field name="title"><![CDATA[Small Business Credit Card – Keeping Business and Personal
Separate]]></field>
<field name="site_id"></field>
<field name="journalist_id"></field>
<field name="network"></field>
<field name="created_date">2009-11-12T05:49:03.000Z</field>
<field name="blog_url"><![CDATA[http://cariblogger.com]]></field>
<field name="outlet"><![CDATA[Caribbean blogs - Cariblogger]]></field>
<field name="state_code"></field>
<field name="journalist_map_id">7578928</field>
<field name="outlet_map_id">74120</field>
<field name="categories"> Finance Business Personal finance news Small business news Array
</field>
</doc>
</add>
```

FIG. 9

| Field Name | Type | Description |
|---|---|---|
| journalist_map_id | Integer | Id from byline map table |
| Outlet_map_id | Integer | Id from outlet map table |
| Site_id | Integer | ID for outlet from MCD |
| Journalist | Char(128) | Byline |
| Article_count | Integer | Number of current articles |
| Firstname | Char(80) | Parsed First Name |
| MiddleName | Char(80) | Parsed Middle Name |
| LastName | Char(80) | Parsed Last Name |
| Valid_name | Boolean | Valid Name Flag |
| Edname_id | Integer | ID for author from MCD |
| Mapped | Boolean | Flag to indicate mapping exists |

FIG. 10

| Field Name | Type | Description |
|---|---|---|
| Journalist_map_id | Integer | Link to master byline map |
| Firstname | Char(80) | First Name |
| MiddleName | Char(80) | Middle Name |
| LastName | Char(80) | Last Name |
| Type | Char(2) | Type of author |
| Journalist | Char(100) | Original byline |
| Title | Char(80) | Title |
| Email | Char(100) | Direct Email |
| Phone | Char(80) | Phone |
| Twitter | Char(100) | Twitter Handle |

MANAGING MEDIA CONTACT AND CONTENT DATA

CROSS REFERENCE TO RELATED APPLICATIONS

This application is a continuation-in-part of U.S. patent application Ser. No. 12/605,998, which was filed on Oct. 26, 2009 and entitled "Systems and Methods for Analyzing, Integrating, and Updating Media Contact and Content Data," which claims priority to U.S. Provisional Patent Application Ser. No. 61/197,205, which was filed on Oct. 24, 2008 and entitled "System and Method for Analyzing, Integrating and Updating Media Contact and Content Data" and is a continuation-in-part of U.S. patent application Ser. No. 11/257,279, which was filed on Oct. 24, 2005 and entitled "System and Method for Analyzing, Integrating and Updating Media Contact and Content Data," and which claims priority to U.S. Provisional Patent Application Ser. No. 60/627,666, which was filed on Nov. 12, 2004 and entitled "Media Contact Base and Integrated Text Analysis Software," and U.S. Provisional Patent Application Ser. No. 60/645,858, which was filed on Jan. 20, 2005 and entitled "Media Database Updating Through Text Analysis." Each previous application is incorporated herein by reference in its entirety.

BACKGROUND

Media service companies maintain media contact databases ("MCDs") containing thousands of media sites in the US and Canada, including daily and weekly newspapers, magazines, radio stations, TV stations and internet sites, including blogs. The MCDs provide extensive contact information on each media site, such as address, telephone, fax, email, station format and call letters (e.g., for broadcast media) data.

In addition, MCDs contain data relating to many, if not all, journalists (approximating 250,000-350,000 journalists) at each of these media sites that has editorial responsibilities including the ability and responsibility to generate independent content. Thus, for example, advertising directors are typically not included in an MCD whereas reporters, newscasters and bloggers generally are included in the database. The MCD contains relevant contact information on each journalist and blogger, including address, telephone, fax and email, as well as the individual's preferred method of receiving press releases (mail, fax or email). Additionally, the MCD also may contain each journalist's or blogger's "beat," or the individual's subject/content area of responsibility. Beats include such titles as News, Features, Sports, Business, Entertainment, Technology, etc.

Public relations professionals use the MCD on behalf of their clients to identify individual journalists or bloggers that might be most receptive to writing an article on the client. A toy company, for example, might retain a public relations professional to promote the release of a new toy. Typically, the public relations professional would first draft a press release announcing the new toy. The public relations professional would then utilize the MCD to generate a list of journalists or bloggers who would be sent a press release, and maybe even a product sample.

The MCD contains a search facility that generates media contact lists according to defined search parameters, including media type, geography and beat. In the above example, the public relations professional might draft a release targeted to business editors and the trade press. The release would discuss the importance of this new toy to the company's product line and perhaps how this new toy extends the company's lead in a segment over its competitors. The public relations professional would then develop a media list of business editors at the major daily newspapers, trade magazines and the major broadcast business shows. Depending on the search criteria, this list might include between 10 to 10,000 journalists. The public relations professional would then try to refine the list by accessing "pitching tips," or notes that subjectively describe a journalist's primary area of interest. Pitching tips are available through commercial providers and many public relations professionals also maintain a proprietary compilation of pitching tips.

These pitching tips, however, are typically subjective, often out-of-date, and never available for more than a handful of journalists. Accordingly, refining the list generated through the MCD search is often subjective and tedious.

Systems widely available today allow the public relations professional to upload the press release into an online application, and an integrated distribution capability distributes the release to every member of the media list according to the preferred method of receipt.

The current methods of targeting journalists and/or bloggers utilizing beat or pitching tips are crude and tedious. Neither method works very well or efficiently. For example, many of the business reporters targeted above may be inappropriate recipients of the press release (and product sample). A journalist covering currency trading in Asia (obviously inappropriate) would be labeled a business reporter in the MCD, just as a journalist covering consumer product companies (more appropriate) would be labeled a business reporter in the MCD. Incorrect targeting entails substantial costs. Product samples sent awry are clearly a waste of money. But, time spent by public relations professionals pitching stories to journalists "off beat" wastes values time and effort. Moreover, bloggers often react adversely to misdirected press releases. In fact, at times bloggers have taken aim in their blogs at the public relations professional that sent the misdirected press release and have even unfairly criticized the company issuing the press release. Conversely, pitches that can be accurately targeted would be expected to produce a better result (more coverage in the press) at a lower cost.

Another problem encountered in the prior art is the time consuming and expensive problem of maintaining the currency and accuracy of the MCD. The MCD is a large, complex database typically including over 250,000-350,000 entries, and each entry may entail numerous data elements (name, address, etc.). The MCD, therefore, may include millions of data elements to be maintained and updated continuously.

The MCD may be updated frequently. Journalists are continuously switching jobs and beats. Media sites (especially magazines and blogs) are continuously launched and closed. And both media sites and journalists have proven unresponsive to potentially more economic, but impersonal, means (email, direct mail) of verifying relevant MCD data.

The currency and accuracy of the MCD has proven the key to customer satisfaction. Telemarketing often is the primary method of maintaining the currency of the MCD. Accordingly, companies that endeavor to maintain a media contact database expend significant sums on personally telephoning media sites and journalists in the MCD to verify database elements.

But, telemarketing entails practical limits on the quality of the MCD. For instance, it may not be possible to update the MCD daily. Even if it were possible to make 350,000 phone calls in one day, journalists might be extremely irritated after the first couple of days. MCD data, however, does change daily (on any given day, journalists change jobs, beats, or may die; media sites change addresses or close). The net result is that often the MCD may be out-of-date, and any updating effort is too little, too late.

One current industry approach is to segment media outlets. So-called "Tier I" sites and journalists are updated (personally contacted by telemarketers) more often than those in "Tier II or III." As an example, a Tier I journalist might be updated six times a year; a Tier II journalist might be updated several times a year. But the tiers are typically constructed based upon the prominence of the media site. The *New York Times*, and its journalists, are updated far more frequently than the *Kenosha Express*. This approach, however, makes no sense to the user that wishes to contact the *Kenosha Express*, and who wants accurate data today regardless of the relative prominence of the newspaper.

SUMMARY

According to one general aspect, an indication of a topic of interest to a user is received at a first computing system from a second computing system that is distinct from the first computing system. In addition, multiple pieces of content are accessed from a computer memory storage system, and the indication of the topic of interest is compared to the multiple pieces of content accessed from the computer memory storage system. Based on results of comparing the indication of the topic of interest to the multiple pieces of content accessed from the computer memory storage system, a piece of content is identified as being relevant to the topic of interest, and, in response, an identifier is identified for an author of the piece of content identified as being relevant to the topic of interest. Contact information for each of multiple authors including identifiers therefor is accessed from a computer memory storage system, and the identifier for the author is compared to the identifiers included in the accessed contact information. Based on results of comparing the identifier for the author to the identifiers included in the accessed contact information, contact information corresponding to the author is identified from within the accessed contact information. Thereafter, an indication of the identity of the author and at least some of the identified contact information corresponding to the author is returned to the second computing system.

In another general aspect, multiple pieces of content that previously have been published in one or more different media outlets are received at a first computing system. At least portions of the received pieces of content that previously have been published are stored within a computer memory storage system. For at least a particular one of the received pieces of content that previously was published, an author of the particular piece of content is identified. Contact information for each of multiple authors is accessed, and, as a consequence of accessing the contact information for the multiple authors, it is determined that contact information corresponding to the author of the particular piece of content is included within the accessed contact information. In response to determining that contact information corresponding to the author of the particular piece of content is included within the accessed contact information, a relationship is established between the particular piece of content and the contact information corresponding to the author of the particular piece of content. Thereafter, an indication of a topic of interest to a user is received at the first computing system from a second computing system that is distinct from the first computing system. At least some of the stored portions of the pieces of content that previously have been published are accessed from the computer memory storage system and the indication of the topic of interest is compared to the accessed portions of the pieces of content that previously have been published. Based on results of comparing the indication of the topic of interest to the accessed portions of the pieces of content that previously have been published, the particular piece of content is identified as being relevant to the topic of interest. In response to identifying the particular piece of content as being relevant to the topic of interest and as a consequence of the established relationship between the particular piece of content and the contact information corresponding to the author of the particular piece of content, the contact information corresponding to the author of the particular piece of content is identified. Thereafter, an indication of the identity of the author of the particular piece of content and at least some of the identified contact information corresponding to the author of the particular piece of content is returned to the second computing system.

In yet another general aspect, multiple pieces of content that previously have been published in one or more different media outlets are received at a first computing system. At least portions of the received pieces of content that previously have been published are stored within a computer memory storage system. For at least a particular one of the received pieces of content that previously was published, a byline for the particular piece of content that specifies a combination of an author of the particular piece of content and a media outlet within which the particular piece of content appeared is stored within a computer memory storage system. Contact information for multiple authors is accessed, and the accessed contact information for the multiple authors is compared to the identified byline for the particular piece of content. Based on results of comparing the accessed contact information for the multiple authors to the identified byline for the particular piece of content, it is determined that the combination of the author and the media outlet within which the particular piece of content appeared does not match any of the accessed contact information for the multiple authors. In response to determining that the combination of the author and the media outlet within which the particular piece of content appeared does not match any of the accessed contact information for the multiple authors, a determination is made to update the contact information for the multiple authors to reflect the combination of the author and the media outlet within which the particular piece of content appeared. Thereafter, contact information for the author at the media outlet within which the particular piece of content appeared is received, and, the contact information for the multiple authors is updated to include an entry that reflects that the author is affiliated with the media outlet within which the particular piece of content appeared and that links the author to the contact information for the author at the media outlet within which the particular piece of content appeared.

In another general aspect, there is provided a computer implemented system for integrating, updating, and searching media related databases and building media lists and reports comprising a first server for receiving digital content from at least one of a plurality of sources; a second server for receiving queries from at least one of a plurality of user computing devices; and a database access layer being utilized by the first and second servers to read and write to a plurality of databases, wherein the plurality of databases comprise a content database, a media database, a mapping database, and a report database. The content database receives at least one article of digital content from the first server via the database access layer and stores the at least one article. The media database receives at least one journalist or blogger data and media outlet data of digital content from the first server via the database access layer and stores the at least one journalist/blogger data and media outlet data. The mapping database stores mapping data between byline data and source outlet data of articles in the content database and journalist/blogger data and media outlet data in the media database for updating the media database. The report database stores user report requests.

Implementations may include one or more of the following features. For example, the system may include an indexing database for receiving the digital content from the first server and maintaining an index of the digital content and an archiver for receiving the digital content from the indexing database for managing the indexing database and storing the digital content. In some implementations, the archiver may include a full archive configured to store the complete text of the digital content for a predetermined period of days and a summary archive configured to store a summary of the digital content after the predetermined period of days. The indexing database may use a training document to search for articles with a predefined percentage of content and the indexing database may create a new category of such articles. In addition, the second server may include a list builder that queries the indexing database for a list of all articles including their mapped author identities in the newly created category. The list builder may sort the list of articles by relevance, apply filters as needed and look up media contact information for each article from the media database. Moreover, the list builder may present the resulting list of articles to the user computing device as a formatted web page with links to more detailed information including a list of recent headlines or storylines authored by the relevant author of each article, an abstract for each article, and a stored copy of the entire copy of each article.

The indexing database may return the results of a query including statistics and supporting articles to the report builder. In addition, the report builder may be configured to receive data from the media database and to provide the results of the query and the data to the user computing device as a formatted web page with custom industry reports and links to more detailed information. In some implementations, the data elements may include a headline, a media outlet source, and section where broadcast or print edition of the article was found.

The system also may include a mapping module configured to compare received digital content to mapping data stored in the mapping database and to store the digital content in a matched content database for articles that could be matched to journalists/bloggers or an unmatched content database for articles that could not be matched to journalists/bloggers.

In some implementations, the system may include a pre-parser configured to receive digital content including a plurality of articles and to parse out a plurality of data elements from each of the plurality of articles in the digital content. In such implementations, the plurality of data elements parsed out from each of the plurality of articles in the digital content may include at least one of headline, byline, date, media outlet source, content body, and section where broadcast or print edition of the article was found. The pre-parser may be configured to forward the parsed elements of digital content to the mapping module for comparison to mapping data stored in the mapping database. The parsed out elements of digital content may be stored in a matched content database for articles that could be matched to authors or stored in an unmatched content database for articles that could not be matched to authors. Additionally or alternatively, the pre-parser may be configured to generate a normalized XML file of the updated digital content data for processing by the indexing database.

Furthermore, the system may include a mapping database configured to store mapping data between byline data and source outlet data of articles in the content database and author data and media outlet data in the media database and to update the media database. Additionally or alternatively, the system may include a report database configured to store user report requests. The pre-parser may be configured to send the plurality of data elements from each article in the digital content to the mapping module for determining the mapping between each article's source and byline and the media outlet and author data in the media database. When the mapping module determines that a match is found, the section of the data elements may be used to confirm or update the author's beat or coverage data and the author is marked as active in the mapping database. Additionally or alternatively, when the mapping module determines that an author match is found at a different source, the mapping module may note the possible alternate source and the author data may be marked as requiring updating in the mapping database. Moreover, when the mapping module determines that no author match is found, an author and a source pair may be marked as new and stored in a daily exception report in the mapping database.

The system also may include an exceptions processor for pulling unmatched digital content data from the unmatched content database and formatting a call down project to telemarketers to update the unmatched digital content data and forward the updated digital content data to the content database via the mapping module. Additionally or alternatively, the exceptions processor also may be configured to process author data and remove duplicate data. Furthermore, the mapping module may be configured to send author data requiring updates to the exception processor for updating and the exception processor may be configured to send such data to a telemarketer for updating. The mapping module also may be configured to send the new author and source pair data to the exception processor for updating and the exception processor may be configured to send the new author and source pair data to a telemarketer for updating. The telemarketer may include contact information for the source and all parsed information relating to an author and the telemarketer may use a customized script to obtain and update relevant contact and beat information for an author. In addition, the telemarketer may forward the updated author data to the mapping module and the mapping module may be configured to forward the updated author data to the media database. The media database may be configured to mark an author data record with an appropriate update date.

The system also may include a simple search engine for providing at least one web page to at least one of the plurality of user computing devices for a user to enter various search criteria. The search criteria may include at least one of an author name, a media outlet name or a keyword. The simple search engine may receive search criteria from a user computing device and the simple search engine may create a query and compare query data to data in the matched content database. For example, the simple search engine may receive query results that include a mapping of the article contents and identifiers of the media outlet and the author with the related article. The simple search engine may query the media database for media contact data about the media outlet and author and then provide the results of the query to the user computing device as a formatted web page with links to more detailed information. Additionally or alternatively, the simple search engine may receive an uploaded press release document or a cut and paste content of a press release document at the at least one web page from one of the plurality of user computing devices. Moreover, the second server may include an upload document module for creating a new category in the indexing database using an application processing index and setting the uploaded press release document or the cut and paste content of the press release document as a training document for a press release.

The second server may include a system web page for user criteria including industry, brand names, and date range to be input by a user and a gathers report application for receiving the user criteria via the system web page. In such implementations, the gathers report application may be configured to parse the user input, generate a standard report request and forward the standard report request to the report database to be stored. Furthermore, the second server also may include a report builder configured to receive the standard report request from the report database and format queries against the indexing database.

In another general aspect, there is provided a method for searching media related databases comprising the steps of providing at least one web page to at least one of a plurality of user computing devices for a user to enter various search criteria at a simple search engine of a first server; creating a query at the first server and comparing query data to data in a matched content database including articles of digital content data received at a second server that could be matched to journalist/blogger data; providing query results to the user computing device as a formatted web page via the first server including a mapping of the article contents and identifiers of the media outlet and the journalist/blogger with the related article from a mapping module at the second server.

Implementations may include one or more of the following features. The media database may be queried for media contact data about the media outlet and author at the second server. In addition, the results of the query may be provided to the user computing device via the first server as a formatted web page with links to more detailed information.

According to yet another general aspect, there is also provided a method for searching media related databases comprising the steps of providing at least one web page to at least one of the plurality of user computing devices for a user to enter various search criteria at a simple search engine of a first server; receiving an uploaded press release document or a cut and paste content of a press release document at the at least one web page from one of the plurality of user computing devices; setting the uploaded press release document or the cut and paste content of the press release document as a training document for a press release, wherein the first server includes an upload document module for creating a new category in an indexing database of a second server of indexed digital content articles using an application processing index; using the training document at the indexing database to search for articles with a predefined percentage of content and creating a new category of such articles.

Implementations may include one or more of the following features. The indexing database may be queried at a list builder of the first server for receiving a list of all articles including their mapped author identities in the newly created category. Furthermore, the list of articles may be sorted by relevance, applying filters as needed and looking up media contact information for each article from a media database at the second server utilizing the list builder. Additionally or alternatively, the resulting list of articles may be presented to the user computing device via the first server as a formatted web page with links to more detailed information including a list of recent headlines or storylines authored by the relevant author of each article, an abstract for each article, and a stored copy of the entire copy of each article.

In still another general aspect, there is further provided a method for building custom media reports from a plurality of media related databases comprising the steps of providing at least one web page to at least one of the plurality of user computing devices from a gathers report application of a first server for a user to enter various user criteria comprising industry, brand names, and date range to be included in a custom media report; receiving the input user criteria at the gathers report application; parsing the input user criteria; generating a standard report request; forwarding the standard report request to a report builder and formatting queries against an indexing database of a second server of indexed digital content articles; receiving results of the query including statistics and supporting articles from the indexing database at the report builder; receiving media data including journalist/blogger and media outlet data from a media database at the report builder; and providing the results of the query and the media data to the user computing device as a formatted web page with custom industry reports and links to more detailed information.

In yet another general aspect, a method for integrating and updating a media related databases is provided. Digital content is received from at least one of a plurality of sources at a first server. At least one article of digital content is received from the first server and stored in a content database. At least one author and media outlet data of digital content is received from the first server and stored in a media database. Mapping data between byline and source outlet data of articles in the content database and author and media outlet data in the media database is stored in a mapping database to update the media database.

Implementations may include one or more of the following features. An index of the digital content received from the first server may be maintained in an indexing database. Additionally or alternatively, the indexing database may be managed and the digital content may be stored in an archiver. In some implementations, the complete text of the digital content may be stored for a predetermined period of days in a full archive section of the archiver and a summary of the digital content may be stored after the predetermined period of days in a summary archive section of the archiver.

In still another general aspect, a method for integrating and updating media related databases is provided. Digital content is received from at least one of a plurality of sources at a first server that includes a pre-parser. A plurality of data elements is parsed out from each of the plurality of articles in the digital content using the pre-parser. The plurality of data elements include at least one of headline, byline, date, media outlet source, content body, and section where broadcast or print edition of the article was found. The parsed out elements of digital content are forwarded to a mapping module for comparison to mapping data stored in a mapping database. The mapping data includes mapping data between byline and source outlet data of articles in a content database and author and media outlet data in a media database. For articles that could be matched to authors, the parsed out elements of digital content are stored in a matched content database. For articles that could not be matched to authors, the parsed out elements of digital content are stored in an unmatched content database. The unmatched digital content data is pulled from the unmatched content database at an exceptions processor of the first server and a call down project is formatted to telemarketers to update the unmatched digital content data. The updated digital content data is forwarded to a content database via the mapping module.

Implementations may include one or more of the following features. A normalized XML file of the updated digital content data may be generated at the pre-parser for processing by an indexing database that maintains an index of the digital content data. Additionally or alternatively, the XML file may be sent from the pre-parser to an XML feed that passes the XML file to the indexing database.

In an additional general aspect, a method for building custom media reports from a plurality of media related databases is provided. At least one web page is provided to at least one of the plurality of user computing devices from a gathers report application of a first server for a user to enter various user criteria including at least one of industry, brand names, and date range to be included in a custom media report. The input user criteria at the gathers report application is received. The input user criteria is parsed, and a standard report request is generated. The standard report request is forwarded to a report builder and queries against an indexing database of a second server of indexed digital content articles are formatted. Results of the query are received including statistics and supporting articles from the indexing database at the report builder. Media data including author and media outlet data is received from a media database at the report builder. The results of the query and the media data are provided to the user computing device as a formatted web page with custom industry reports and links to more detailed information.

In another general aspect, a computer implemented system for integrating and searching media related databases includes at least one server for receiving digital content from at least one of a plurality of sources and for receiving queries from at least one of a plurality of user computing devices. In addition, the system includes means utilized by the at least one server for reading and writing data to a plurality of databases, wherein the plurality of databases include at least a content database and a media database. The content database is configured to receive at least one article of digital content from the at least one server and to store the at least one article. The media database is configured to contain at least one author data and media outlet data for each piece of stored digital content. The system also includes a mapping module for matching author data and media outlet data from the received digital content to at least one author data and media outlet data stored in the media database.

In yet another general aspect, a method for integrating and searching media related databases is provided. At least one server is provided. In the at least one server, digital content is received from at least one of a plurality of sources. In addition, in the at least one server, queries are received from at least one of a plurality of user computing devices. Means utilized by the at least one server are provided for reading and writing data to a plurality of databases. The plurality of databases include at least a content database and a media database. At least one article of digital content is received and stored in the content database from the at least one server. Furthermore, at least one author data and media outlet data is stored in the media database for each piece of stored digital content. Author data and media outlet data from the received digital content is matched in a mapping module to at least one author data and media outlet data stored in the media database.

The various aspects, implementations, and features disclosed may be implemented using, for example, one or more of a method, an apparatus, a system, tool, or processing device for performing a method, a program or other set of instructions, an apparatus that includes a program or a set of instructions, and a computer program stored on a tangible, computer-readable storage medium. The tangible, computer-readable storage medium may include, for example, instructions that, when executed, cause a computer to perform acts specified by the instructions.

The details of one or more implementations are set forth in the accompanying drawings and the description below. Other features will be apparent from the description and the drawings, and from the claims.

BRIEF DESCRIPTION OF THE DRAWINGS

FIGS. 1A-1F are screenshots of an example of a graphical user interface that provides a user with access to a system that enables the user to both identify journalists who write about topics of interest to the user and to locate contact information for these journalists.

FIG. 5 illustrates an example of an article received from a feed.

FIG. 7 is an example of a template for an outlet map record.

FIG. 8 is an example of a template for a journalist map record.

FIG. 9 is an example of a snippet of XML for adding an article to a content database.

FIG. 10 is an example of a template for a master byline map record.

FIG. 11 is an example of a template for a byline contact database record.

FIG. 22 provides a screen shot of a journalist detail report which provides contact information for a journalist as well a listing of articles authored by the journalist.

DETAILED DESCRIPTION

A media contact database stores information about a large number of journalists (e.g., 200,000), including both journalists who are affiliated with recognized media outlets that have editorial oversight (e.g., printed publications, on-line websites, television stations, radio stations, etc.) as well as journalists who are not affiliated with recognized media outlets that have editorial oversight (e.g., freelance journalists and bloggers). For example, for each journalist, the media contact database may store one or more of the journalist's name, the journalist's title, the outlet with which the journalist is affiliated (if appropriate), contact information for the journalist (e.g., an e-mail address, a telephone number, a mailing address, a facsimile number, a Twitter handle, and/or a URL for a blog or other website maintained by the journalist), an indication of the journalist's beat, and a unique editor ID that is assigned to the journalist by the media contact database.

In addition, a content database stores a large volume of content that has been published or otherwise produced by various different recognized media outlets as well as other content sources. The content stored by the content database is indexed, allowing a search engine to search the content database for relevant content. Furthermore, the byline data (e.g., author and source) for some, if not all, of the individual pieces of content stored in the content database is mapped to the journalist information stored in the media contact database. This mapping enables a user interested in communicating with the author of a piece of content that the user found particularly relevant to both identify the author and to quickly locate contact information for the author (e.g., an e-mail address, a telephone number, a mailing address, a facsimile number, a Twitter handle, and/or a URL for a blog or other website maintained by the author). This mapping may be especially helpful when the author produces content that appears in various different media outlets (e.g., because the author works for a newswire, the author is a freelance journalist who is not affiliated with any particular media outlet, the author writes articles that are syndicated to many different media outlets, the author works for a media group and is published in a subset of the media outlets controlled by the media group, or the author is a noted contributor, for instance a politician or a professional, who periodically publishes articles in several different media outlets), as it enables the interested user to locate accurate contact information for the author rather than subjecting the interested user to a wild goose chase from media outlet to media outlet only to learn that the author does not actually work for any of the different media outlets in which content authored by the author has appeared.

Figure 1A:
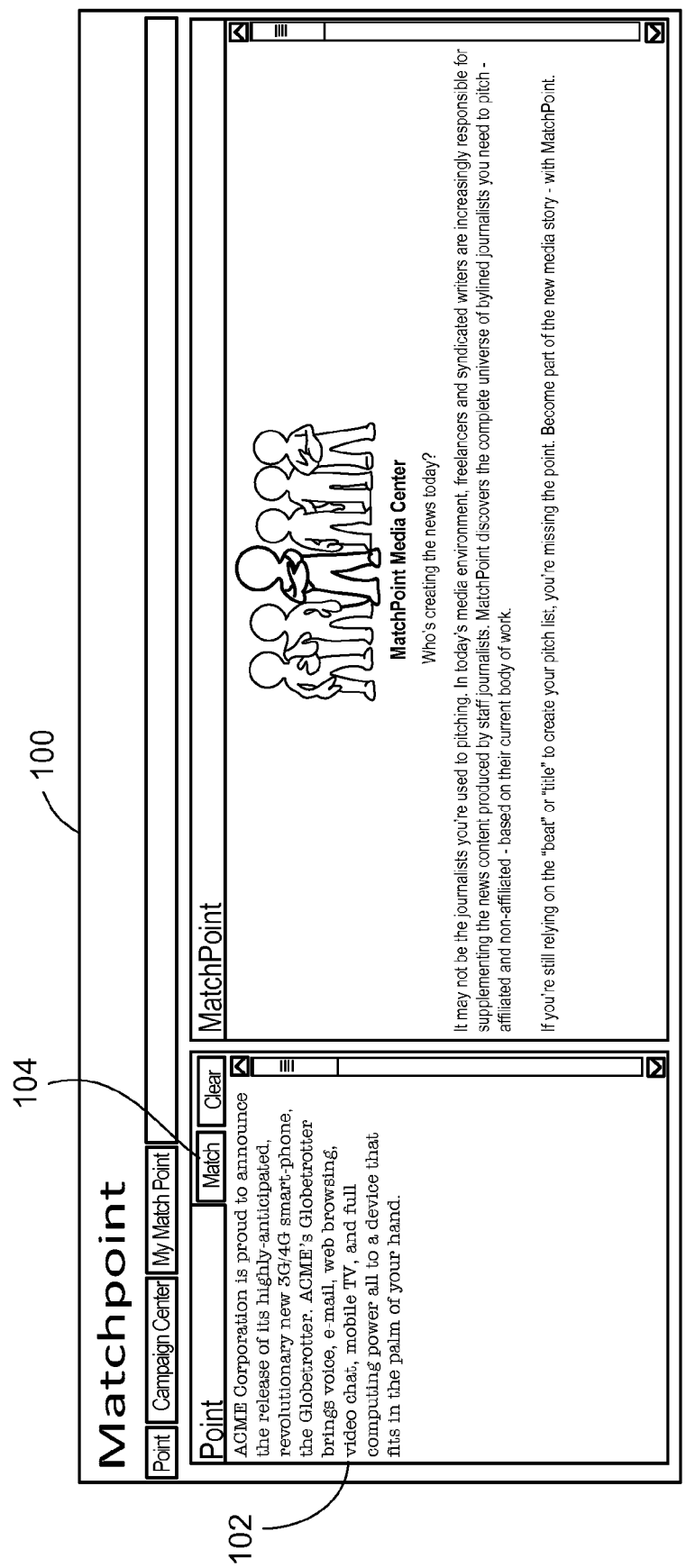

FIG. 1A is a screenshot of an example of a graphical user interface 100 that provides a user with access to a system that enables the user to both identify journalists who write about topics of interest to the user and to locate contact information for these journalists. For example, graphical user interface 100 provides a public relations professional seeking to identify journalists who have written about topics relevant to a product or service the public relations professional is promoting with access to a system that enables the public relations to both identify journalists who have written articles related to the product or service being promoted and to locate contact information for these journalists so that the public relations professional can pitch these journalists to write about the product or service being promoted by the public relations professional.

Referring to FIG. 1A, graphical user interface 100 includes a data entry section 102 that enables a user to provide a textual description of a topic of interest to the user. For example, graphical user interface 100 enables a public relations professional to enter a textual description of a product or service being promoted by the publication relations professional. In some implementations, graphical user interface 100 may require that the user type or otherwise enter the textual description of the topic of interest into the data entry section 102. Additionally or alternatively, graphical user interface 100 may enable a user to "cut and paste" the textual description of the topic of interest into the data entry section 102 from an alternative source and/or graphical user interface 100 may enable a user to upload the textual description of the topic of interest from an alternative source. For example, in some implementations, graphical user interface 100 may enable a public relations professional to "cut and paste" and/or upload a press release related to a product or service being promoted by the public relations professional to the data entry section 102.

As illustrated in FIG. 1A, a public relations professional engaged by ACME Corporation has entered a press release related to a new smart-phone being released by ACME into data entry section 102. Invocation of "Match" button 104 causes the system to compare the press release to a database of hundreds of thousands of articles to identify those articles stored in the database that are most relevant to the press release and to return the names and contact information for the authors of the most relevant articles.

Figure 1B:
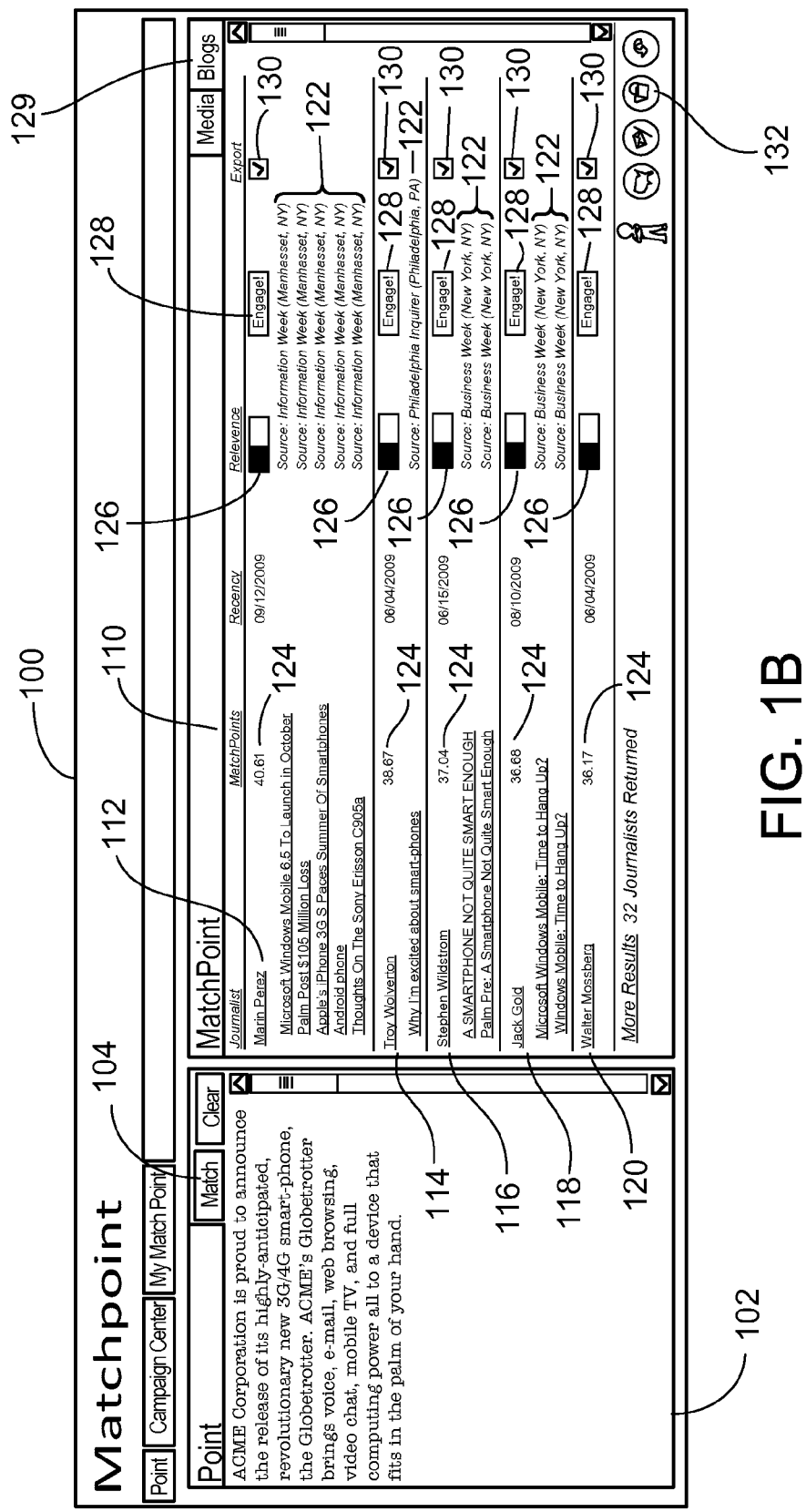

For example, referring to FIG. 1B, in response to invocation of "Match" button 104, the system compared the press release about ACME's new smart-phone to the database of articles and updated results section 110 to identify to the public relations professional thirty two journalists who have written articles that are relevant to the press release about ACME's new smart phone. In particular, results section 110 identifies "Marin Perez" 112, "Troy Wolverton" 114, "Stephen Wildstrom" 116, "Jack Gold" 118, and "Walter Mossberg" 120, among others, as journalists who have written articles that are relevant to the press release about ACME's new smart phone.

In addition, and as will be described in greater detail below, results section 110 also provides mechanisms for the public relations professional to locate contact information for and to directly communicate with each of these journalists who have been identified as having written articles that are relevant to the press release about ACME's new smart phone. Conveniently, the contact information made available for the journalists identified in the results section 110 is contact information for the journalist at the media outlet at which the journalist is employed irrespective of which media outlet actually carried the article(s) that were written by the journalist that were identified as being relevant to the press release. As a result, the public relations professional is assured of getting accurate contact information for the journalist even if the journalist published the article identified as being relevant to the press release in an outlet that is different from the outlet for which the journalist is employed and/or if the journalist works for a newswire or some other outlet that is syndicated across many different media outlets. For example, if the journalist is employed by the *New York Times* but happened to write an article that is identified as being relevant to the press release about ACME's new smart-phone while on special assignment for the *Washington Post*, the contact information for the journalist that is made available to the public relations professional is contact information for the journalist at the *New York Times*. Similarly, if the journalist is employed by the Associated Press ("AP"), an article written by the journalist that has been identified as being relevant to the press release may have been carried in both the *New York Times* and the *Washington Post*. Nevertheless, the contact information for the journalist that is made available to the public relations professional is the contact information for the journalist at the AP. In this manner, the public relations professional is assured of getting accurate contact information for the journalist even if the journalist authors articles that appear in a wide variety of different outlets.

Results section 110 also identifies one or more articles (and the outlets in which they appeared) 122 that were determined to be relevant to the press release about ACME's new smart phone. Furthermore, graphical user interface 100 enables the public relations professional to review each of these articles to render a personal assessment of their relevance by clicking on (or otherwise selecting) the selectable link (e.g., hyperlink) that corresponds to a particular one of these articles 122.

In addition to identifying journalists who have written articles that are relevant to the press release about ACME's new smart phone, the system also assesses the relevancy to the press release of the articles written by the identified journalists and provides the public relations professional with numeric indications 124 and graphical indications 126 of the perceived relevance of the articles written by the different journalists.

Furthermore, in addition to the functionality already described above, the results section 110 of graphical user interface 100 also enables the public relations professional to export contact information for one or more of the journalists listed in the results section 110 to another application, such as, for example, a spreadsheet application. Specifically, the results section 100 enables the public relations professional to select journalists for whom the public relations professional desires to export contact information to another application by selecting the "Export" radio buttons 130 corresponding to the desired journalists and then invoking export button 132. In response to such actions by the public relations professional, the system compiles contact information for each of the journalists for whom the public relations professional selected the corresponding "Export" radio button 130 and exports the compiled contact information to another application, such as, for example a spreadsheet application, for the public relations professional. The ability for the public relations professional to export the contact information for multiple journalists to a single application in this manner may enable the public relations professional to quickly create a mail merge or similar mass mailing campaign.

As illustrated in FIG. 1B, the journalists listed in results section 110 are limited to journalists who write for recognized media outlets with editorial oversight. However, the content database also stores articles and other content that appeared on web logs ("blogs") and, therefore, identifies articles and other content that appeared on web logs that is relevant to the press release about ACME's new smart phone in addition to articles that appeared in recognized medial outlets with editorial oversight. Invocation of "Blogs" button 129 causes the graphical user interface 100 to update the results section 110 to list blogs on which articles or other content relevant to the press release about ACME's new smart phone have appeared.

Figure 1C:
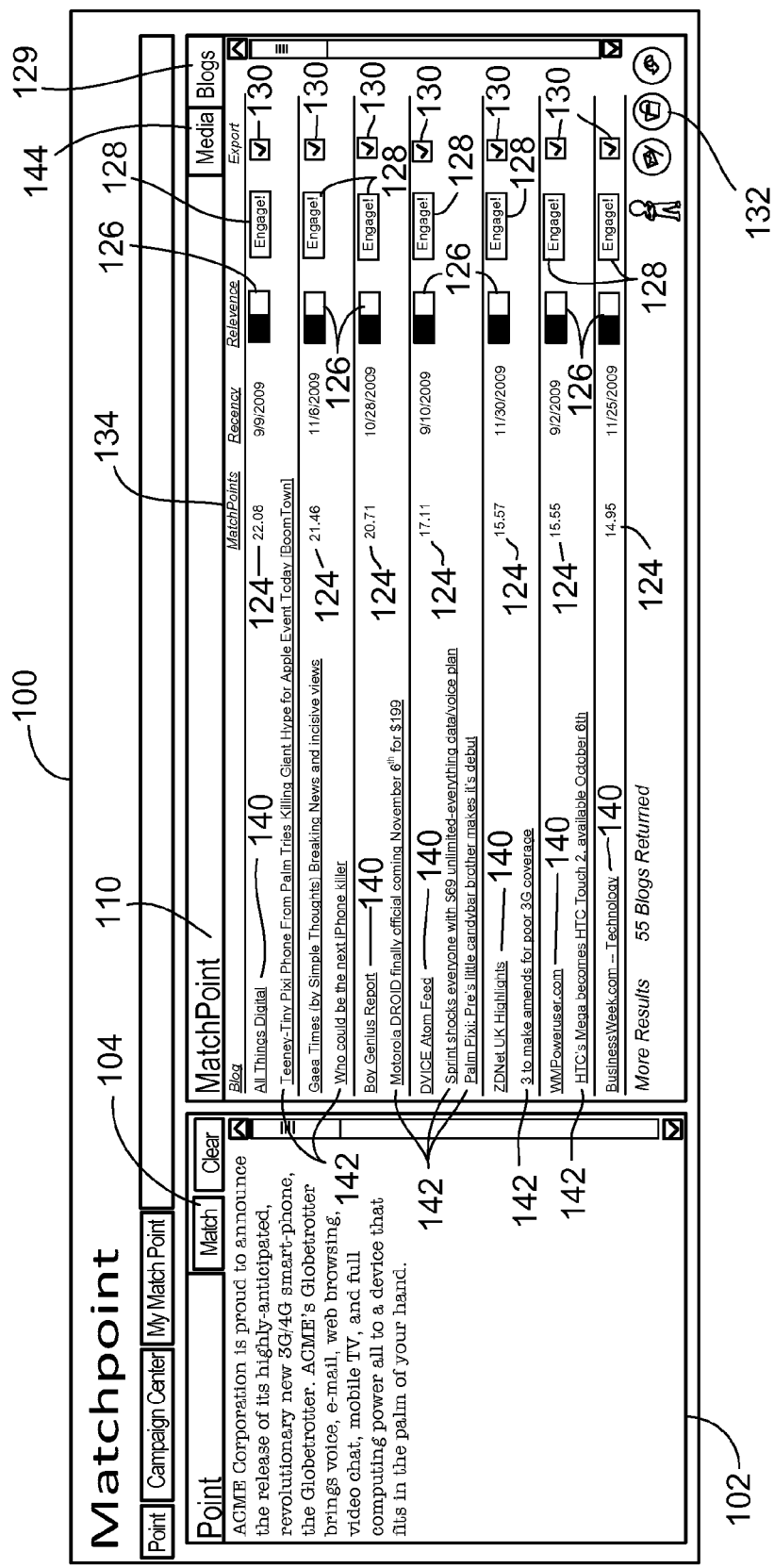

For example, referring to FIG. 1C, invocation of "Blogs" button 128 causes the graphical user interface 100 to update the results section 110 to identify fifty five different blogs 140 on which articles or other content relevant to the press release about ACME's new smart phone have appeared. In addition, results section 110 also identifies one or more articles 142 that appeared on each of the identified blogs 140 that are relevant to the press release about ACME's new smart phone and enables the public relations professional to review each of these articles 142 to personally assess their relevance by clicking on (or otherwise selecting) the selectable link corresponding to a particular one of these articles 142. The results section 110 also enables the public relations professional to navigate to each of the identified blogs 140 by clicking on (or otherwise selecting) the selectable link corresponding to the blog 140. Furthermore, the results section 110 provides the public relations professional with numeric indications 124 and graphical indications 126 of the perceived relevance to the press release about ACME's new smart phone of the blogs 140 listed in the results section 110. Moreover, as with the journalists who write for recognized media outlets with editorial oversight, results section 110 enables the public relations professional to export contact information for one or more of the blogs 140 to another application by selecting the "Export" radio buttons 130 for the blogs 140 for which the public relations professional desires to export contact information and then invoking export button 132.

Invocation of "Media" button 144 enables the public relations professional to instruct graphical user interface 100 to update the results section 110 to again list the journalists who write for recognized media outlets with editorial oversight who have written articles that are relevant to the press release about ACME's new smart phone as illustrated in FIG. 1B.

Referring again to FIG. 1B, the graphical user interface 100 enables the public relations professional to gather more information about any one of the journalists identified as having written articles that are relevant to the press release about ACME's new smart phone either by "clicking on" or otherwise selecting the journalist's name from within the results section 110 and/or by invoking the "Engage" button 128 corresponding to the particular journalist.

For example, "clicking on" or otherwise selecting the name of journalist "Marin Perez" 112 from the results section 110 causes graphical user interface 100 to launch a new journalist information window 150, illustrated in FIG. 1D, that includes more information about the journalist "Marin Perez." In particular, journalist information window 150 displays contact information 152 for the journalist "Marin Perez," including the journalist's name 154, media outlet 156, mailing address 158, title 160, e-mail address 162, telephone number 164, and facsimile number 166. In addition, the journalist information window 150 also includes a listing 168 of articles 122 authored by the journalist "Marin Perez" that are stored in the content database and enables the public relations professional to review any one of the listed articles 122 by "clicking on" or otherwise selecting the article 122 within the listing 168. Furthermore, the journalist information window 150 identifies those articles that were determined to be relevant to the press release about the new ACME smart-phone by displaying a "Match" icon 170 adjacent to each of the relevant articles 122.

Conveniently, the journalist information window 150 is configured to list articles authored by the journalist "Marvin Perez" that appeared in numerous different outlets, not just in

*Information Week*, which is the outlet that employs the journalist "Marvin Perez." As a result, if the journalist "Marvin Perez" had published an article that was relevant to the press release about the new ACME smart-phone but that appeared in a publication other than *Information Week*, the public relations professional still would be exposed to the article and, yet, the journalist information window 150 would convey the contact information 152 for the journalist "Marvin Perez" at *Information Week* so that the public relations professional would not waste time attempting to locate and/or contact the journalist "Marvin Perez" at the other publication.

Referring again to FIG. 1B, the graphical user interface 100 also enables the public relations professional to communicate directly with any one of the journalists identified as having written articles that are relevant to the press release about ACME's new smart phone by invoking the "Engage" button 128 corresponding to the particular journalist. For example, invoking the "Engage" button 128 corresponding to the journalist "Marin Perez" 112 causes the graphical user interface 100 to launch a new journalist contact window 180, illustrated in FIG. 1E, that enables the public relations professional to send an e-mail directly to the journalist "Marin Perez."

Figure 1E:
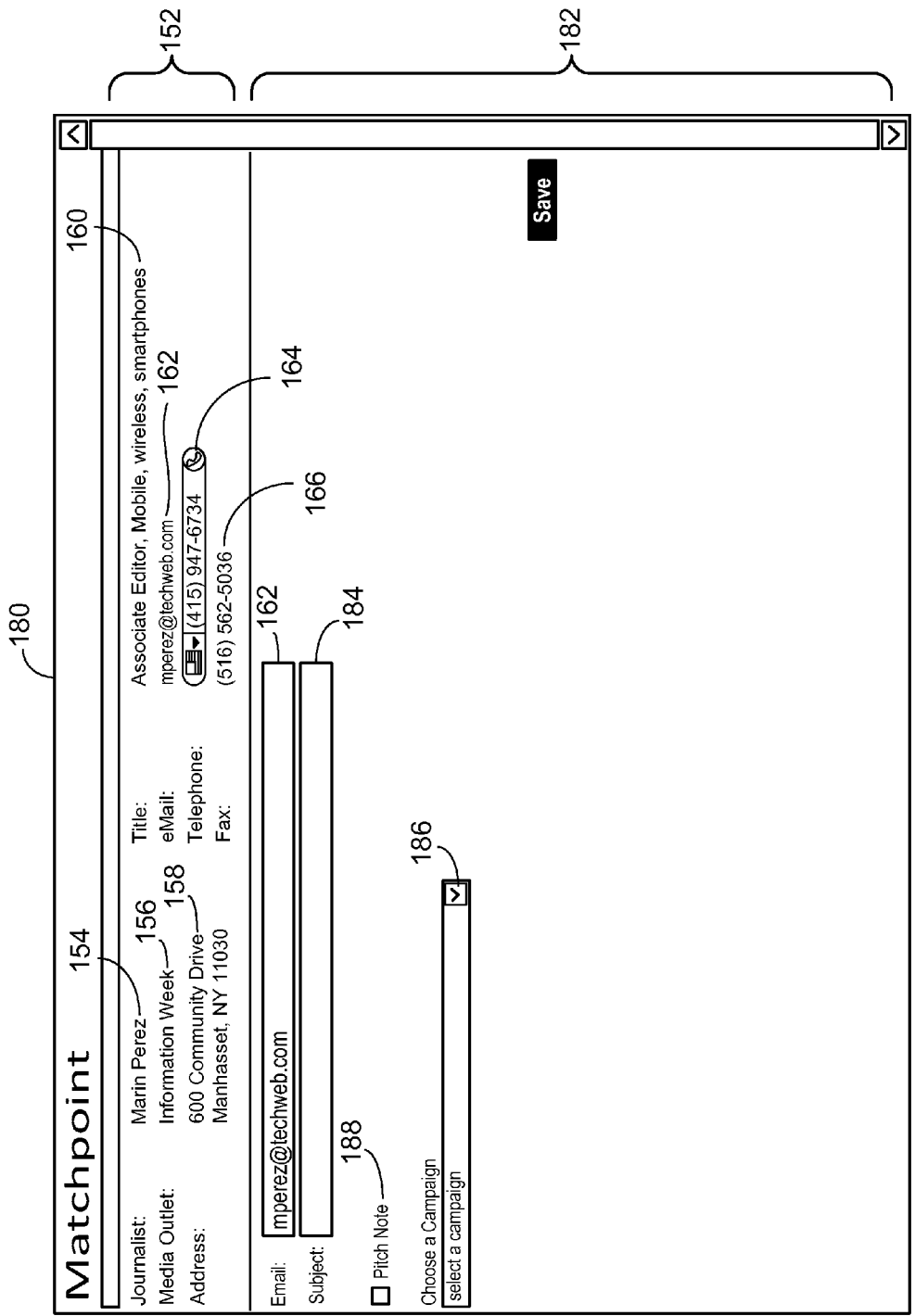

Referring to FIG. 1E, the journalist contact window 180 displays contact information 152 for the journalist "Marin Perez," including the journalist's name 154, media outlet 156, mailing address 158, title 160, e-mail address 162, telephone number 164, and facsimile number 166. In addition, the journalist contact window 180 also includes an e-mail entry form 182 that is pre-addressed with the e-mail address for the journalist "Marin Perez" that enables the public relations professional to send an e-mail directly to the journalist "Marin Perez." In addition, the e-mail entry form 182 includes a subject field 184 that enables the public relations professional to add a subject to the e-mail, a "Choose a Campaign" drop-down menu 186 that enables the public relations professional to select previously-generated promotional materials from among a menu of various different promotional materials to be uploaded and attached to the e-mail, and a selectable "Pitch Note" radio button 188 that, when selected, causes a text entry field (not shown) to be displayed that enables the public relations professional to compose a message to the journalist "Marin Perez." When the public relations professional is satisfied with the e-mail to the journalist "Marin Perez," the e-mail entry form 182 enables the public relations professional to send the e-mail by invoking the "Send" button 190. Thus, through the journalist contact window 180, the graphical user interface 100 provides the public relations professional with a convenient mechanism for composing a message and sending pitch materials to the journalist "Marin Perez," who has been identified as an author that has written articles that are relevant to the press release about ACME's new smart-phone.

It will be appreciated that invoking an "Engage" button 128 corresponding to a particular blog 140 in the results section 110 illustrated in FIG. 1C will result in a similar blog contact window (not shown) being displayed that enables the public relations professional to communicate directly with a contact person at the blog 140 (e.g., an individual who maintains the blog and/or a contributor to the blog), for instance, by composing and sending an e-mail to the contact person.

As discussed above in connection with FIG. 1B, in addition to identifying journalists who have written relevant articles, the system also assesses the relevancy of the articles written by the identified journalists and provides the public relations professional with numeric indications 124 of the perceived relevance of the articles written by the different journalists. In some implementations, the system may enable the public relations professional to personalize the criteria that are used by the system to generate these numeric relevancy scores 124. For example, in response to the public relations professional "clicking on" or otherwise selecting selectable "Match-Points" link 134, graphical user interface 100 launches a new relevancy score personalization window 192, illustrated in FIG. 1F, that enables the public relations professional to personalize the weights applied to each criteria that is factored in to calculating the numeric relevancy scores 124.

Figure 1F:
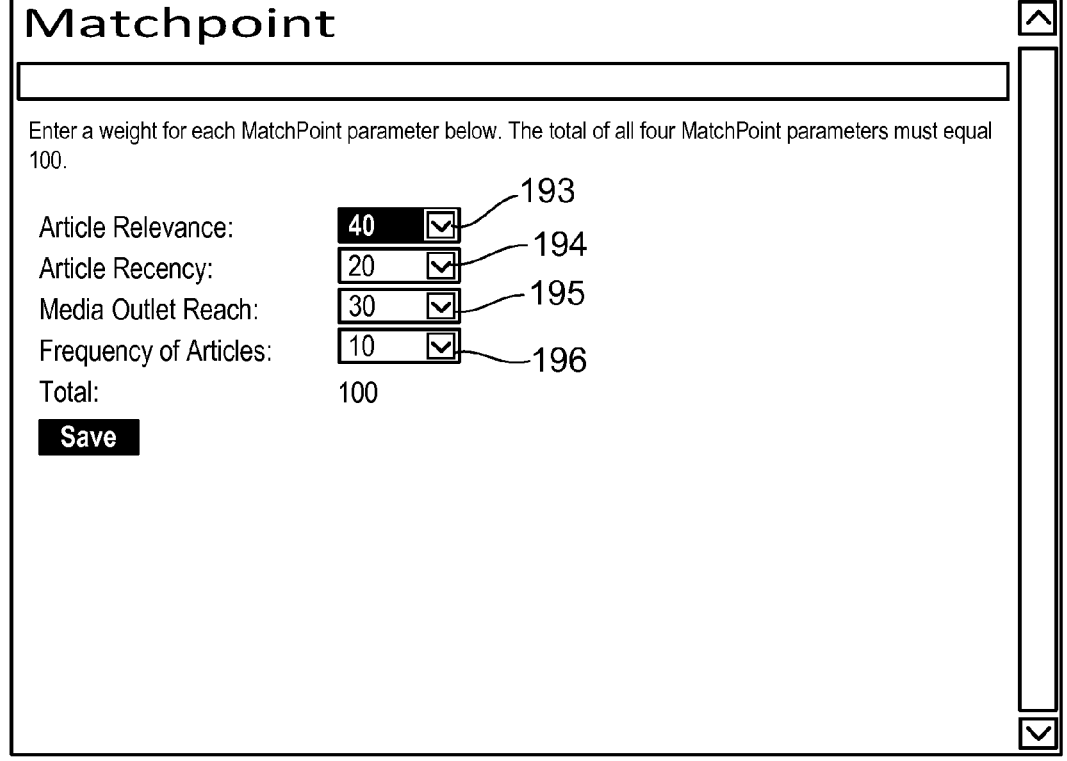

As illustrated in FIG. 1F, the numeric relevancy score for each journalist (or blog) is comprised of an article relevance component, an article recency component, a media outlet reach component, and a frequency of articles component. When the system compares the press release for the new ACME smart phone to each of the articles stored in the content database, the system assigns each article a relevancy score based on the extent to which the article is perceived to relate to the press release. In some implementations, the highest relevancy score assigned to an article by the journalist (or that appeared on the blog) that was determined to be relevant is used for the relevancy component of the numeric relevancy score for the journalist (or blog). In other implementations, the relevancy scores for each of the articles by the journalist (or that appeared on the blog) that were determined to be relevant are averaged in order to determine the relevancy score for the journalist (or blog). In some implementations, the date on which the most relevant article written by the journalist (or that appeared on the blog) is used as the basis for the recency component of the numeric relevancy store for the journalist (or blog). In other implementations, the recency component of the numeric relevancy score is based on the most recent date on which the journalist (or blog) published an article that was determined to be relevant. In some implementations, the reach (e.g., circulation) of the media outlet within which the most relevant article written by the journalist is used as the basis for the media outlet reach component of the numeric relevancy scores. In other implementations, the media outlet reach component of the numeric relevancy scores is based on an average of the reach of the different media outlets within which the journalist published articles that were determined to be relevant. Lastly, the frequency component of the numeric relevancy score for the journalist (or blog) is based on the number of articles written by the author (or that appeared on the blog) that were determined to be relevant. Using drop down menus 193, 194, 195, and 196, the public relations professional can specify the weights to be applied to each of the relevance component, the recency component, the media outlet reach component, and the frequency component in calculating the numeric relevancy score for the journalists (or blogs).

Figure 2:
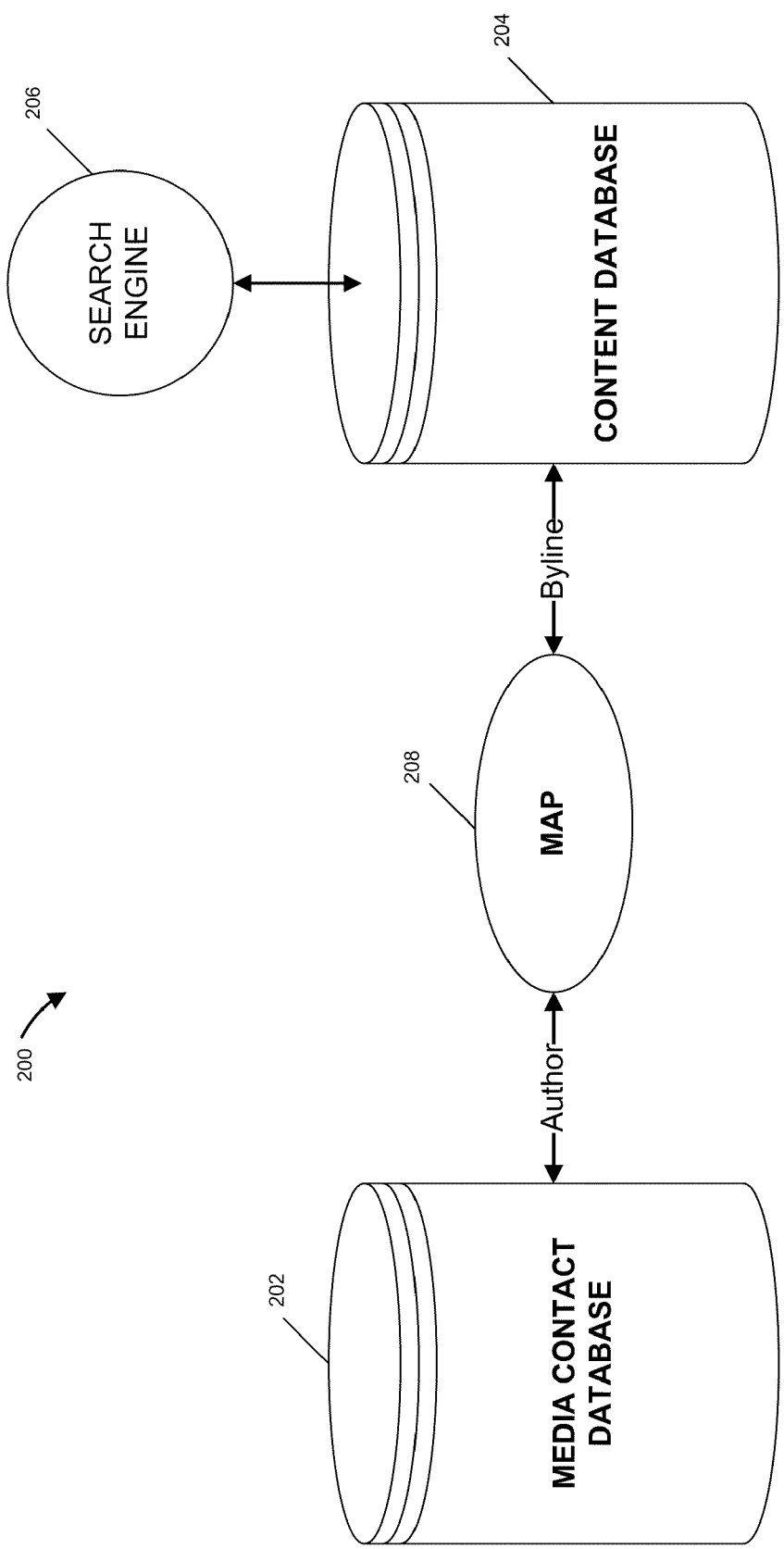
FIG. 2 is a block diagram of a system for identifying authors, and contact information for such authors, of content that is relevant to a topic of interest to a user.

FIG. 2 is a block diagram of a system 200 for identifying authors, and contact information for such authors, of content that is relevant to a topic of interest to a user. The system 200 includes a media contact database 202 that stores contact information for a large number of journalists and other producers of content (e.g., bloggers). For example, for a given journalist, the media contact database may store the journalist's name, title, outlet, telephone number, mailing address, e-mail address, facsimile address, beat, and an editor ID for uniquely identifying the journalist within the media contact database 202.

In addition, the system also includes a content database 204 that stores a large number of articles authored by journalists and other producers of content (e.g., bloggers). Many, if not all, of the articles stored in content database 204 include bylines that specify the author(s) of the articles and the outlets in which the articles appeared. In addition, the articles stored in content database 204 are indexed such that search engine 206 can search the articles stored in content database 204 for articles that are relevant to a topic of interest to a user.

Search engine 206 may be accessible to a user of a client computer over a network (e.g., the Internet). Furthermore, search engine 206 may be configured to receive a textual description of a topic of interest to the user (e.g., one or more keywords, a formatted search query, or a press release), to compare the received textual description of the topic of interest to the indexed articles stored in the content database 204, and to identify articles stored in the content database 204 as relevant to the user's topic of interest based on results of comparing the received textual description of the topic of interest to the indexed articles.

As illustrated in FIG. 2, system 200 also includes a map 208 that maps the bylines of the articles stored in content database 204 to the contact information stored in media contact database 202. Therefore, when search engine 206 identifies one or more articles stored in content database 204 as being relevant to the topic of interest to the user, the search engine 206 is not only able to return the identified articles and their authors to the user, but, by consulting map 208, the search engine 206 also is able to return contact information for the authors of the identified articles to the user as well.

Figure 3:
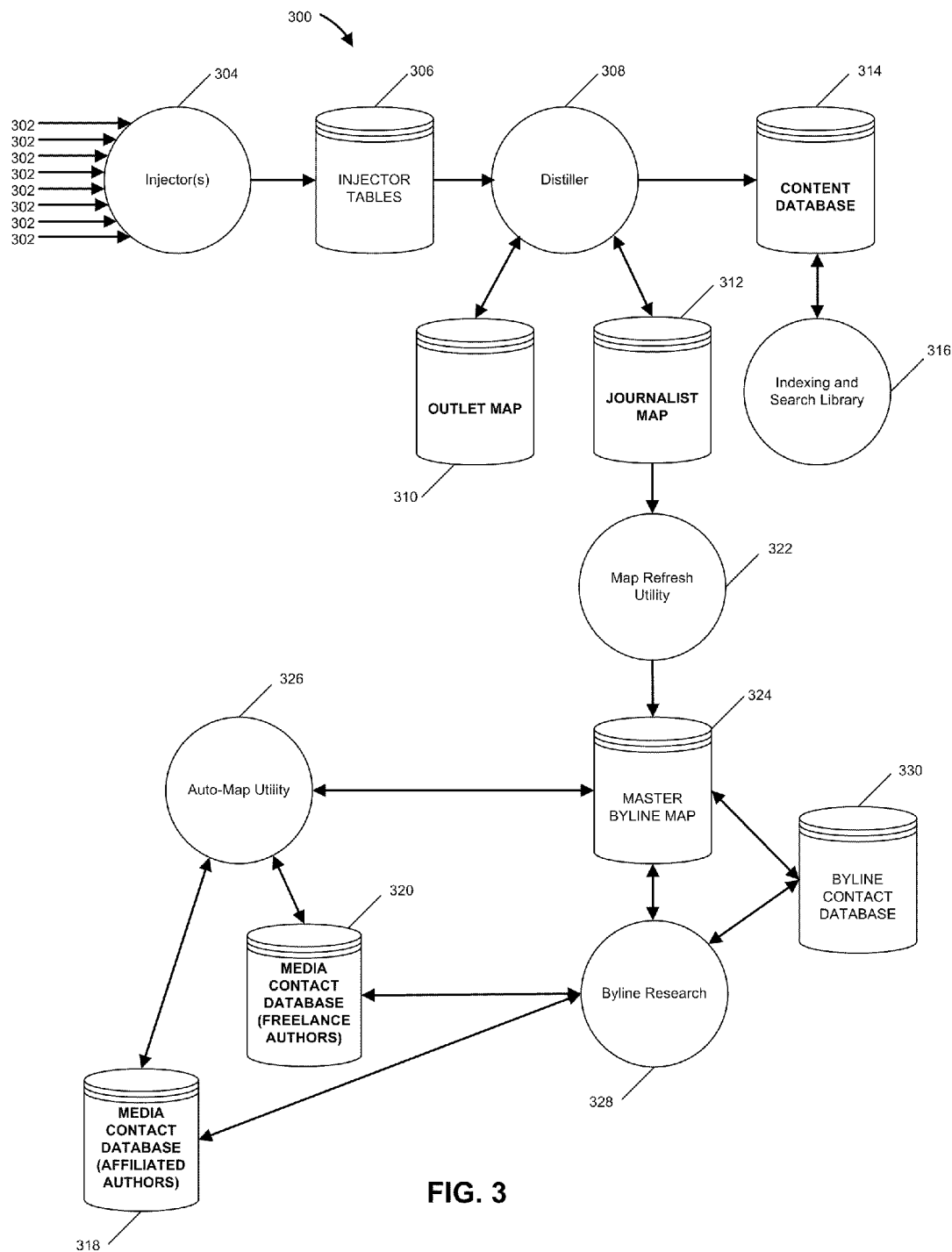
FIG. 3 is a block diagram of a system that stores content and contact information for content authors and that maps the contact information for the content authors to bylines of the stored content.

FIG. 3 is a block diagram of a system 300 that stores content and contact information for content authors and that maps the contact information for the content authors to bylines of the stored content. As illustrated in FIG. 3, the system 300 receives content from a variety of different feeds 302, such as, for example, content providers (such as Lexis-Nexis®, Google™ News, etc.), media websites (including blogs), companies who "clip," scan, and compile print, online and broadcast content, TV sources wherein the content is available as transcripts, captured through closed captioning and stored digitally or captured and digitized by voice-to-text software, and radio sources wherein the content is available as transcripts or captured and digitized by voice-to-text software.

The content that is received from feeds 302 may be received in a variety of different formats. Therefore, upon receipt, the content is processed by one or more injectors 304 that parse the received content, extract important data from the received content, repackage the received content in a normalized format, and store the repackaged content in injector tables 306. For example, in some implementations, the injectors 304 may repackage the received content into a format that is common to all content that has been received and processed by the injectors 304.

Distiller 308 accesses the repackaged content from the injector tables 306 and distills the repackaged content into records that it stores in outlet map 310, journalist map 312, and content database 314. In particular, distiller 308 extracts information about the media outlet in which a received article was published from injector tables 306 and stores this information about the media outlet in outlet map 310. Similarly, distiller 308 extracts information about the byline (e.g., author(s) and media outlet) of a received article from injector tables 306 and stores information about the byline in journalist map 312. In addition, distiller 308 extracts the body of a received article and other identifying information for the received article from the injector tables 306 and stores the body of the article and its identifying information in content database 314.

The articles stored in content database 314 are indexed by indexing and search library 316 (e.g., a Lucene-powered index and search library), which enables a user to search the articles stored in content database 314 for articles that are related to a topic of interest to the user. In some implementations, articles are stored in content database 314 only for a defined period of time. For example, an article may be expired from content database 314 after six months.

System 300 also includes media contact databases 318 and 320 for, among other things, storing contact information for various different authors. In particular, media contact database 318 stores contact information for journalists who work for recognized media outlets that have editorial oversight. Media contact database 320 similarly stores contact information for journalists who do not work for recognized media outlets that have editorial oversight but who nevertheless publish content that is relevant to system 300. For example, media contact database 320 stores contact information for bloggers and freelance journalists. Individually or collectively, media contact databases 318 and 320 may store contact information for several hundred thousand authors, if not more. Furthermore, in some implementations, it may be important to keep contact information for journalists affiliated with recognized media outlets with editorial oversight separate from the contact information for journalists who are not affiliated with recognized media outlets with editorial oversight. Separating media content databases 318 and 320 into distinct databases, therefore, may serve to maintain the distinction between the contact information for those two groups of journalists.

System 300 uses the information stored in journalist map 312 and media contact databases 318 and 320 to generate mappings between the bylines for articles stored in content database 314 and the contact information for authors stored in either of media contact databases 318 and 320. By virtue of these mappings, when a user locates an article that is relevant to a topic of interest to the user in content database 314, the system is able to provide the user with contact information for the author of the article. This functionality may be particularly useful to a public relations professional who is promoting a product or service and who is attempting to locate and pitch authors who have written articles that are relevant to the product or service the public relations professional is promoting. Furthermore, byline information stored in journalist map 312 may alert system 300 to the fact that the contact information for one or more authors stored in media contact databases 318 and 320 is out of date and in need of updating. In this manner, system 300 improves the accuracy of the contact information stored in media contact databases 318 and 320.

In order to generate mappings between the bylines for articles stored in content database 314 and the contact information for authors stored in media contact databases 318 and 320, map refresh utility 322 periodically (e.g., daily) accesses journalist map 312 and identifies any new bylines that have been added to journalist map 312. Map refresh utility 322 then stores these new bylines in master byline map 324 and creates new entries for these bylines in byline contact database 330.

When new bylines are added to master byline map 324, auto-map utility 326 accesses the new bylines from master byline map 324 and compares the new bylines to the contact information stored in media contact databases 318 and 320. In the event that a new byline in master byline map 324 matches contact information stored in either of media contact databases 318 and 320, auto-map utility 326 acknowledges the new byline as a valid byline and updates the record in the master byline map 324 for the new byline such that the new byline is mapped to the corresponding contact information stored in either of media contact databases 318 and 320.

If the new byline does not match contact information stored in either of media contact databases 318 and 320 (e.g., the new byline identifies an author for whom contact information is not stored in media contact databases 318 and 320 or the new byline identifies the source of the article as a media outlet other than the media outlet with which one of media contact databases 318 and 320 identifies the author as being affiliated), the new byline is passed to byline research 328 for further investigation. Byline research 328 may include one or both of an automated research engine and manual researchers (e.g., telemarketers) that attempt to identify appropriate contact information for the author identified in the new byline.

In the case where the new byline identifies an author for whom contact information is not stored in one of media contact databases 318 and 320, byline research 328 attempts to identify appropriate contact information for the author and, after successfully identifying such contact information, byline research 328 adds a record for the author to one of media contact databases 318 and 320 and updates master byline map 324 and byline contact database 330. For example, if byline research 328 reveals that the author is affiliated with a recognized media outlet with editorial oversight, a record for the journalist including contact information for the journalist at the media outlet with which the journalist is affiliated is added to media contact database 318, and the new bylines in master byline map 324 and byline contact database 330 are updated to map the new bylines to the contact information for the journalist that has been newly added to the media contact database 318. In contrast, if byline research 328 reveals that the author is not affiliated with a recognized media outlet with editorial oversight (e.g., byline research reveals that the author is a freelance journalist or a blogger), contact information for the author is added to media contact database 320 and the new bylines in mater byline map 328 and byline contact database 330 are updated to include a record that maps the new bylines to the contact information for the author that has been newly added to media contact database 320.

In the case where contact information for the author is stored in one of media contact databases 318 and 320, but the new byline identifies the source of the article as a media outlet that is different from the media outlet with which the contact information for the author identifies the author as being affiliated, byline research 328 investigates to determine whether the contact information for the author stored in one of media contact databases 318 and 320 is correct. In the event that byline research 328 reveals that the contact information for the author stored in one of media contact databases 318 and 320 is correct, the auto-map utility 326 updates the new bylines stored in master byline map 324 and byline contact details 330 to map the new byline to the contact information for the author stored in one of media contact databases 318 and 320. In this manner, system 300 provides a mapping between an article and the correct contact information for the author of the article even if the author of the article published the article in a media outlet other than the author's primary media outlet. In contrast, if byline research 328 reveals that the contact information for the author stored in one of media contact databases 318 and 320 is incorrect, byline research 328 identifies accurate contact information for the author, updates the contact information for the author stored in either of media contact databases 318 and 320, and updates the new bylines and any other bylines corresponding to the author stored in master byline map 324 and byline contact database 330 to map the new bylines and the other bylines corresponding to the author to the updated contact information for the author stored in either of media contact databases 318 and 320.

Figure 4A:
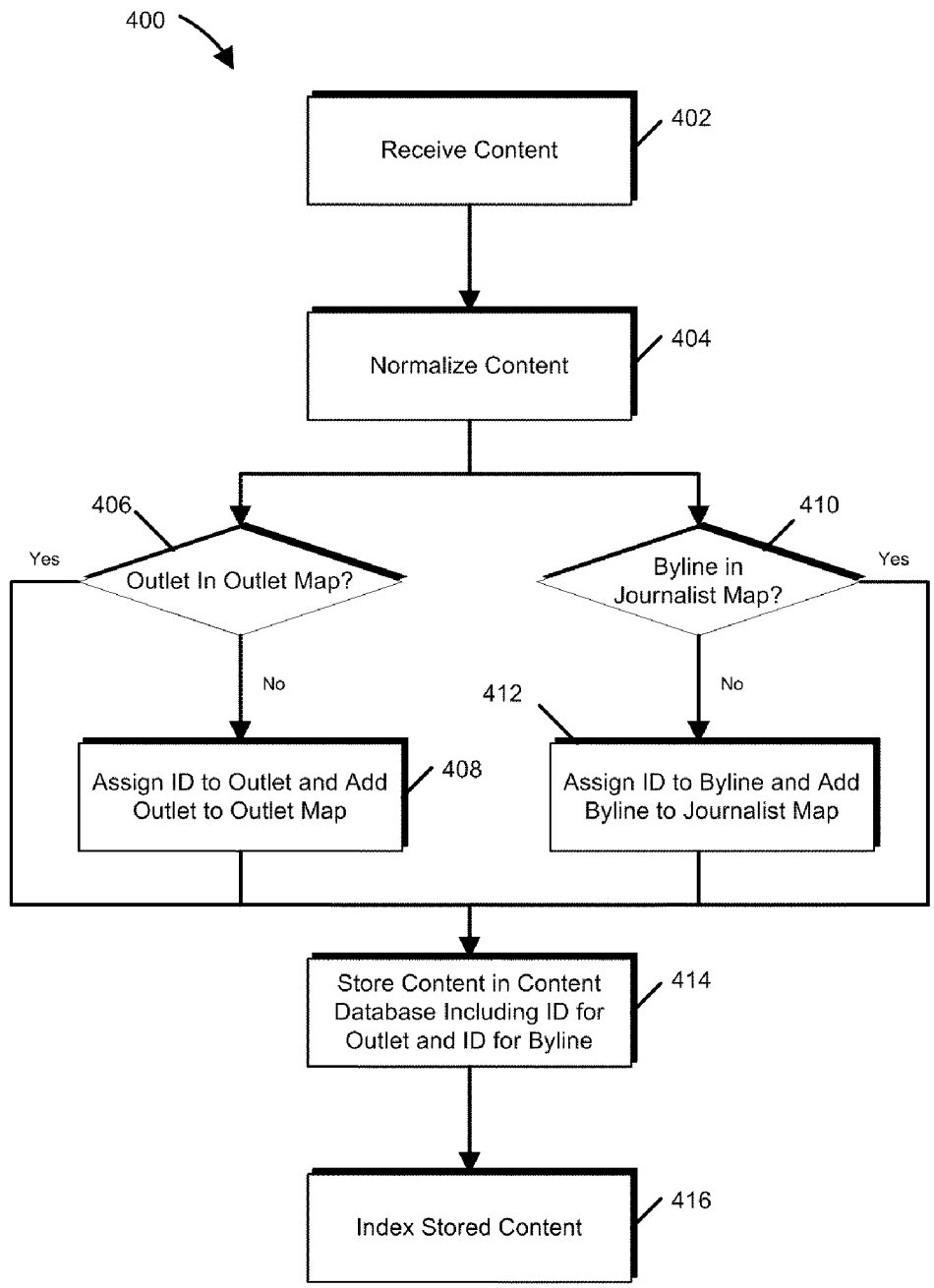
FIG. 4A is a flowchart of an example of a process for processing received content.
Figure 4B:
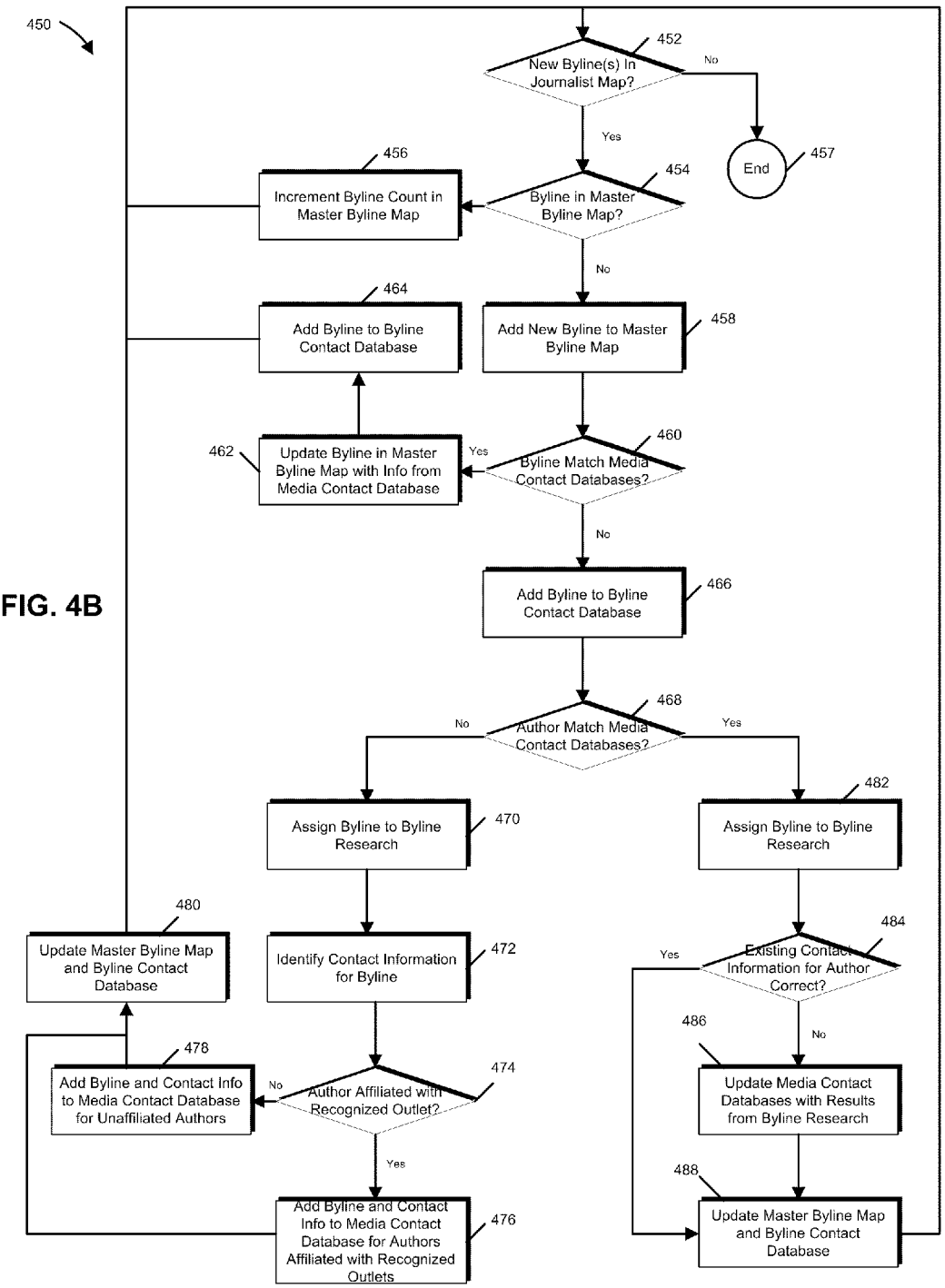
FIG. 4B is a flowchart of an example of a process for mapping bylines of stored content to stored contact information for authors.

FIG. 4A is a flowchart 400 of an example of a process for processing received content and FIG. 4B is a flowchart 450 of an example of a process for mapping bylines of stored content to stored contact information for content authors. Operation of system 300 will now be described in greater detail with respect to FIGS. 4A and 4B.

As illustrated in FIG. 4A, the process for processing received content begins when content is received (402). As described above, a piece of content can be received from any number of feeds 302 and in any of a variety of different formats. FIG. 5 illustrates an example of an article 500 received from one of feeds 302.

Figure 6:
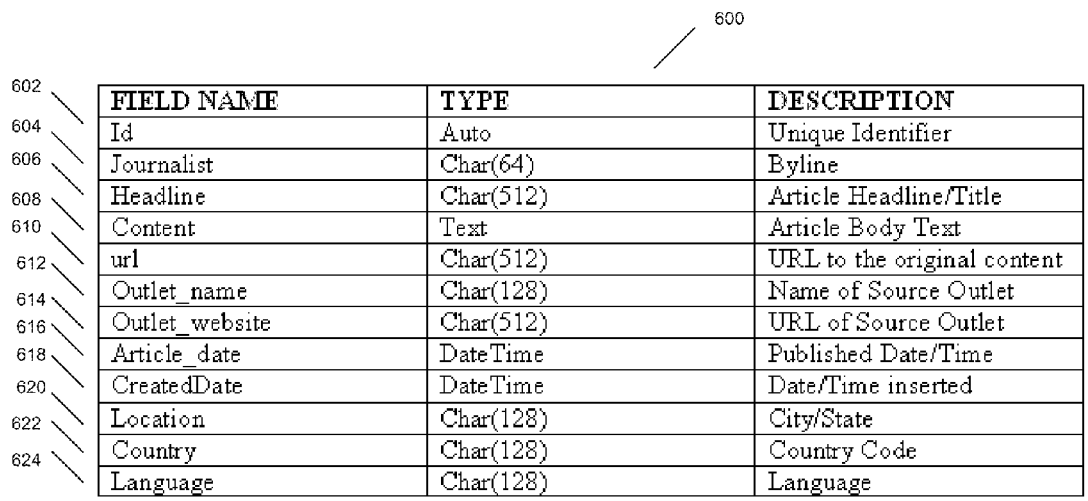
FIG. 6 is an example of a template for a record in an injector table.

After an article is received from one of feeds 302, an injector 304 parses the article, extracts certain information from the article, repackages the article into a normalized format, and stores the normalized article in injector tables 306 (404). FIG. 6 is an example of a template 600 for a record in an injector table that illustrates one example of a normalized format for storing a received article. As illustrated in FIG. 6, the record 600 for an article stored in injector tables 306 may include twelve different fields that store different information about the article. For example, the record 600 may include an ID field 602 that specifies a unique ID 602 for the stored article; a journalist field 604 that stores the byline (e.g., author and media outlet) for the stored article; a headline field 606 that stores the headline for the stored article; and a content field 608 that stores the text of the body of the stored article. In addition, the record 600 also may include a URL field 610 that specifies the URL for the original article (e.g., if published on-line); an Outlet_Name field 612 that specifies the name of the media outlet in which the article appeared; an Outlet_Website field 614 that specifies the URL for the outlet in which the article appeared; an Article_Date field 616 that specifies the date and time on which the article was published; a CreatedDate field 618 that specifies the date and time on which the article was added to the injector tables 306; a location field 620 that identifies the city and/or state in which the source media outlet is located; a country field 622 that identifies the country in which the source media outlet is located; and a language field 624 that identifies the language in which the article is written. It will be appreciated that some of the fields in record 600 may not be required fields and, therefore, may be left empty for any given article.

After the received content has been normalized by injectors 304 and stored in injector tables 306, distiller 308 accesses the normalized content and determines whether an entry for the media outlet in which the content appeared already exists in outlet map 310 (406).

FIG. 7 is an example of a template for an outlet map record 700 that illustrates one example of a record for a media outlet stored in outlet map 310. As illustrated in FIG. 7, outlet map record 700 includes a Map_Id field 702 that specifies a unique identifier for the media outlet; a Content_Source field 704 that specifies the feed 302 from which articles from the media outlet are received; an outlet field 706 that specifies the name of the media outlet; and an Outlet_Id field 708 that maps to a unique ID for the media outlet stored in one of media contact databases 318 and 320.

In some implementations, multiple different feeds 302 may provide system 300 with content from the same media outlet. For example, a first feed 302 may provide system 300 with content from the *New York Times* and a second feed 302 also may provide system 300 with content from the *New York Times*. In such cases, for the purposes of the outlet map 310, the content from the *New York Times* provided by the first feed 302 may be considered to be from a different media outlet than the content from the New York Times provided by the second feed 302. Therefore, two separate entries may be created in the outlet map 310: one for the content from the *New York Times* provided by the first feed 302 and a second for the content from the *New York Times* provided by the second feed 302. Both entries may have Outlet_Id fields 708 that map to the same unique media outlet ID in media contact database 318, however, because both entries correspond to content from the same media outlet, i.e., the *New York Times*.

Similarly, content may be received from multiple different sources that actually all originated from the same media outlet. For example, articles that are scraped from NYTimes.com also may be scraped from Yahoo! Feeds. In such cases, for the purposes of outlet map 310, articles that are scraped from NYTimes.com may be considered to be from a different media outlet than the same articles scraped from Yahoo! Feeds. Therefore, two separate entries may be created in the outlet map 310: one for the articles scraped from NYTimes.com and a second for the articles scraped from Yahoo! Feeds. Both entries may have Outlet_Id fields 708 that map to the same unique media outlet ID in media contact database 318, however, because both entries correspond to content that originated from the same media outlet, i.e., NYTimes.com.

Referring again to FIG. 7, outlet map record 700 also includes a Has Articles field 710 that specifies whether articles from the media outlet to which the record 700 corresponds currently are stored in content database 314; a Date Inserted field 712 that specifies the date and time on which the record 700 was added to the outlet map 310; and a State Code field 714 that specifies the state in which the media outlet to which entry 700 corresponds is located. In some cases, one or more fields in outlet map record 700 may be left undefined.

Referring again to FIG. 4A, if distiller 308 determines that an entry for the media outlet in which the content appeared already exists in outlet map 310, distiller 308 identifies the entry for the media outlet in outlet map 310, extracts the Map_Id for the media outlet from the outlet map 310, and adds the Map_Id for the media outlet to the article. In contrast, if distiller 308 determines that there is no entry for the media outlet in which the article appeared in outlet map 310, distiller 308 adds a new entry for the media outlet to the outlet map 310 and adds the Map_Id for the media outlet from the new entry in the outlet map 310 to the article (408).

In addition to determining whether an entry for the media outlet in which the article appeared already exists in outlet map 310, distiller 308 also determines whether an entry for the byline for the article already exists in journalist map 312 (410).

FIG. 8 is an example of a template for a journalist map record 800 that illustrates one example of a record for a byline stored in journalist map 312. As illustrated in FIG. 8, journalist map record 800 includes a Map_Id field 802 that specifies a unique identifier for the byline; an Outlet_Map_Id field 804 that maps the media outlet identified in the byline to the unique ID for the media outlet in the outlet map table 310; a journalist field 806 that includes the byline for the article; a Journalist_Id field 808 that maps the author of the article to a unique ID for the author stored in media contact databases 318 and 320; and a Date Inserted field 810 that specifies the date and time at which the entry 800 was added to the journalist map 310. In some cases, one or more fields in journalist map record 800 may be left undefined.

Referring again to FIG. 4A, if distiller 308 determines that an entry for the byline for the article already exists in journalist map 312, distiller 308 identifies the entry for the byline in journalist map 312, extracts the Map_Id for the byline from the journalist map 312, and adds the Map_Id for the byline to the article. In contrast, if distiller 308 determines that there is no entry for the byline in journalist map 312, distiller 308 adds a new entry for the byline to the journalist map 312 and adds the Map_Id for the byline from the new entry in the journalist map 310 to the article (412).

After the distiller 308 has added the outlet Map_Id and the journalist Map_Id to the article, the distiller 308 adds the article to content database 314 (414). FIG. 9 is an example of a snippet of XML 900 for adding an article to content database 314. As illustrated in FIG. 9, the snippet of XML for adding the article to content database 314 includes, among other features, the text of the article 902, the outlet Map_Id 904 for the outlet that carried the article, and the journalist Map_Id 906 for the byline for the article.

After the article has been added to content database 314, the article is indexed by indexing and search library 316 (416) so that the article is accessible to a search engine.

FIG. 4B is a flowchart 450 of a process for mapping bylines of stored content to stored contact information for authors. In particular, the process maps bylines of content stored in content database 314 to contact information for the authors that is stored in one of media contact databases 318 and 320 in part by creating and maintaining records in master byline map 324 and byline contact database 330.

FIG. 10 is an example of a template for a master byline map record 1000 that illustrates one example of a record for a byline stored in master byline map 324. As illustrated in FIG. 10, master byline map entry 1000 includes a Journalist_Map_Id field 1002 that maps the entry 1000 for the byline to the unique ID for the byline stored in the journalist map 312; an Outlet_Map_Id field 1004 that maps the entry 1000 for the byline to the unique ID for the media outlet identified in the byline stored in the outlet map table 310; and a Site_Id field 1006 that maps to a unique ID for the media outlet stored in one of media contact databases 318 and 320. In addition, entry 1000 includes a journalist field 1008 that specifies the byline (e.g., journalist name and media outlet); an Article_Count field 1010 that specifies the number of articles stored in content database 314 that are attributed to the byline. Entry 1000 also includes a FirstName field 1012 that specifies the first name of the author; a MiddleName field 1014 that specifies the middle name of the author; a LastName field 1016 that specifies the last name of the author; and a Valid_Name field 1018 that specifies whether the name for the author included in the byline is a valid name. For example, in some cases, due to an error or otherwise, the perceived byline for an article may not identify a valid name for an author. In such cases, the value in the Valid_Name field of entry 1000 is set to false. Record 1000 also includes an Edname_Id field 1020 that maps entry 1000 to a unique ID for the author stored in media contacts database 318 if the author is affiliated with a recognized media outlet having editorial oversight; and a mapped field 1032 that specifies whether entry 1000 has been mapped to a corresponding entry for the author stored in either of media contacts databases 318 and 320. In some cases, one or more fields in master byline map record 1000 may be left undefined.

FIG. 11 is an example of a template for a byline contact database record 1100 that illustrates one example of a record for a byline stored in byline contact database 330. As illustrated in FIG. 11, byline contact database record 1100 includes a Journalist_Map_Id field 1102 that maps the entry 1100 for the byline to the unique ID for the byline stored in the journalist map 312; a FirstName field 1104 that specifies the first name of the author; a MiddleName field 1106 that specifies the middle name of the author; and a LastName field 1108 that specifies the last name of the author. In addition, byline contact database record 1100 also includes a type field 1110 that specifies the type of author; a journalist field 1112 that specifies the byline (e.g., journalist name and media outlet); a title field 1114 that specifies the author's title with the media outlet; an e-mail field 1116 that specifies the author's e-mail address; a phone field 1118 that specifies the author's phone number; and a Twitter field 1120 that specifies the author's Twitter handle. In some implementations, byline contact database record 1100 may include additional or alternative fields including, for example, a mailing address field that specifies the author's mailing address and/or a facsimile field that specifies the author's facsimile number. In some cases, one or more fields in byline contact database record 1100 may be left undefined.

Periodically (e.g., daily), map refresh utility 322 determines if any new bylines have been added to journalist map 312 (452). If a new byline has been added to the journalist map 312, the map refresh utility 322 determines whether there already is an entry for the byline in master byline map 324 (454).

If the map refresh utility 322 determines that an entry for the new byline already exists in the master byline map 324, the map refresh utility increments the Article_Count field 1010 for the entry in the master byline map 324 (456) to reflect the newly added article to the content database 314 and then determines if there are any other new bylines in the journalist map 312 (452). If another new byline exists in journalist map 312, the process repeats, whereas if no new bylines exist in journalist map 312, the process ends (457).

In the event that there is not an entry for the new byline in the master byline map 324, the map refresh utility 322 adds a new entry for the new byline to the master byline map 324 (458).

Thereafter, auto-map utility 326 determines whether the entry for the byline that was newly added to the master byline map 324 matches an entry for a journalist stored in either of media contact databases 318 and 320 (460). That is to say, auto-map utility 326 determines if the author and media outlet pairing specified in the byline match an entry for a journalist stored in either of media contact databases 318 and 320. If the author and media outlet pairing specified in the byline match an entry for an author stored in either of media contact databases 318 and 320, the auto-map utility 326 accesses the entry for the author stored in either of media contact databases 318 and 320 and uses information from the entry for the author stored in either of media contact databases 318 and 320 to update the byline entry stored in the master byline map 324 (462). In addition, the auto-map utility 326 adds a new entry for the byline to byline contact database 330 and uses information from the entry for the author stored in media contact databases 318 and 320 to populate the new entry for the byline stored in one of byline contact database 330 (464).

For example, if the byline specifies that the article was written by John Doe of the *New York Times*, and media contact database 318 includes an entry for an author John Doe at the *New York Times*, the auto-map utility 326 accesses the entry for John Doe at the *New York Times* stored in media contact database 318 and uses the contact information stored in media contact database 318 for John Doe at the *New York Times* to update the FirstName 1012, MiddleName 1014, LastName 1016, and Edname_Id 1020 fields for the byline entry in the master byline map 324. In addition, the auto-map utility 326 adds an entry for the byline to byline contact database 330 and uses the contact information stored in media contact database 318 for John Doe at the *New York Times* to populate the fields of the newly-created byline entry in the byline contact database 330.

After the master byline map 324 and byline contact database 330 have been updated, the auto-map utility 326 determines whether any additional new bylines have been added to journalist map 312 (452). If another new byline exists in journalist map 312, the process repeats, whereas if no new bylines exist in journalist map 312, the process ends (457).

If the entry for the byline that was newly added to the master byline map 324 does not match an entry for a journalist stored in either of media contact databases 318 and 320, the auto-map utility 326 adds a new entry for the byline to byline contact database 330 (466). Thereafter, the auto-map utility 326 determines whether the author listed in the byline entry that was newly added to the master byline map 324 matches any of the authors for whom contact information is stored in either of media contact databases 318 and 320 (468).

In the event that the author listed in the byline entry that was newly added to the master byline map 324 does not match any of the authors for whom contact information is stored in one of media contact databases 318 and 320, the auto-map utility assigns the newly added byline entry to byline research 328 (470) to identify appropriate contact information for the author listed in the byline entry that was newly added to the master byline map 324 (472).

Byline research 328 may be performed by an automated computer process and/or by manual research. For example, an automated computer process may search the world wide web for contact information for the author. Additionally or alternatively, a researcher may surf the world wide web manually and/or place telephone calls to various different media outlets in order to identify and confirm contact information for the author.

After contact information has been identified for the author, a determination is made as to whether the author is affiliated with a recognized media outlet having editorial oversight (474). In the event that the author is affiliated with a recognized media outlet having editorial oversight, the byline that was newly added to the master byline map 324 and the contact information for the author revealed through byline research 328 are added to media contact database 318 (476). In contrast, if the author is determined not to be affiliated with a recognized media outlet having editorial oversight (e.g., the author is a blogger or freelance journalist), the byline that was newly added to the master byline map 324 and the contact information for the author listed in the byline are added to media contact database 320 (478).

After the byline and contact information have been added to the appropriate media contact database, the master byline map 324 and byline contact database 330 are updated such that the byline entries stored in the master byline map 324 and byline contact database 330 to and/or include the contact information for the author listed in the byline that is stored in either of media contact databases 318 and 320 (480). Thereafter, a determination is made as to whether any additional new bylines remain in journalist map 312 (452). If another new byline exists in journalist map 312, the process repeats, whereas if no new bylines exist in journalist map 312, the process ends (457).

If, at operation 468, the auto-map utility 326 determines that the author listed in the byline entry that was newly added to the master byline map 324 matches one of the authors for whom contact information is stored in either of media contact databases 318 and 320, the auto-map utility 326 assigns the newly added byline entry to byline research 328 (482) to determine whether the existing contact information for the author stored in one of media contact databases 318 and 320 is correct (484) and to resolve any discrepancies between the byline and the information for the author stored in one of media contact databases 318 and 320.

One example of a discrepancy that may be identified as a result of determining that the byline that was newly added to the master byline map 324 does not completely match any of the entries stored in either of media contact databases 318 and 320 but that the author does match an author for whom contact information is stored in either of media contact databases 318 and 320 is that the newly added byline may suggest that the author works for one media outlet while the contact information for the author stored in either of media contact databases 318 and 320 suggests that the author works for a different media outlet. In such a scenario, the byline that was newly added to the master byline map 324 may be assigned to byline research 328 in order to determine whether the author works for the media outlet suggested by the contact information stored in one of media contact databases 318 and 320 (e.g., if the author wrote for the media outlet suggested by the new byline on special assignment) or whether the author works for the media outlet suggested by the new byline (e.g., if the author changed jobs).

In the event that byline research 328 reveals that the existing contact information for the author stored in either of media contact databases 318 and 320 is incorrect (e.g., if it is determined that the author has changed jobs and now works for the media outlet suggested by the byline), the contact information for the author stored in either of media contact databases 318 and 320 is updated to reflect the correct contact information for the author (486), and the master byline map 324 and byline contact database 330 are updated such that the byline entries stored in the master byline map 324 and byline contact database 330 map to and/or include the updated contact information for the author stored in one of media contact databases 318 and 320 (488). Similarly, if byline research 328 reveals that the existing contact information for the author stored in media contact databases 318 and 320 is correct, the master byline map 324 and byline contact database 330 are updated such that the byline entries stored in the master byline map 324 and byline contact database 330 map to and/or include the existing contact information for the author listed in the byline that is stored in one of media contact databases 318 and 320 (488).

In some scenarios, byline research 328 may reveal that the author for whom contact information is stored in one of media contact databases 318 and 320 and the author listed in the byline share the same name, but actually are two different individuals. In such cases, the existing contact information stored in either of media contact databases 318 and 320 may be maintained, and a new entry for the author listed in the byline may be added to one of media contact databases 318 and 320 to store the contact information for the author listed in the byline that is uncovered by byline research 328. In addition, the byline entries in master byline map 324 and byline contact database 330 for the new byline may be updated to reflect the contact information for the author listed in the new byline that is uncovered by byline research 328.

After the master byline map 324 and byline contact details 330 have been updated to reflect byline research 328, a determination is made as to whether any additional new bylines remain in journalist map 312 (452). If another new byline exists in journalist map 312, the process repeats, whereas if no new bylines exist in journalist map 312, the process ends (457).

Figure 12:
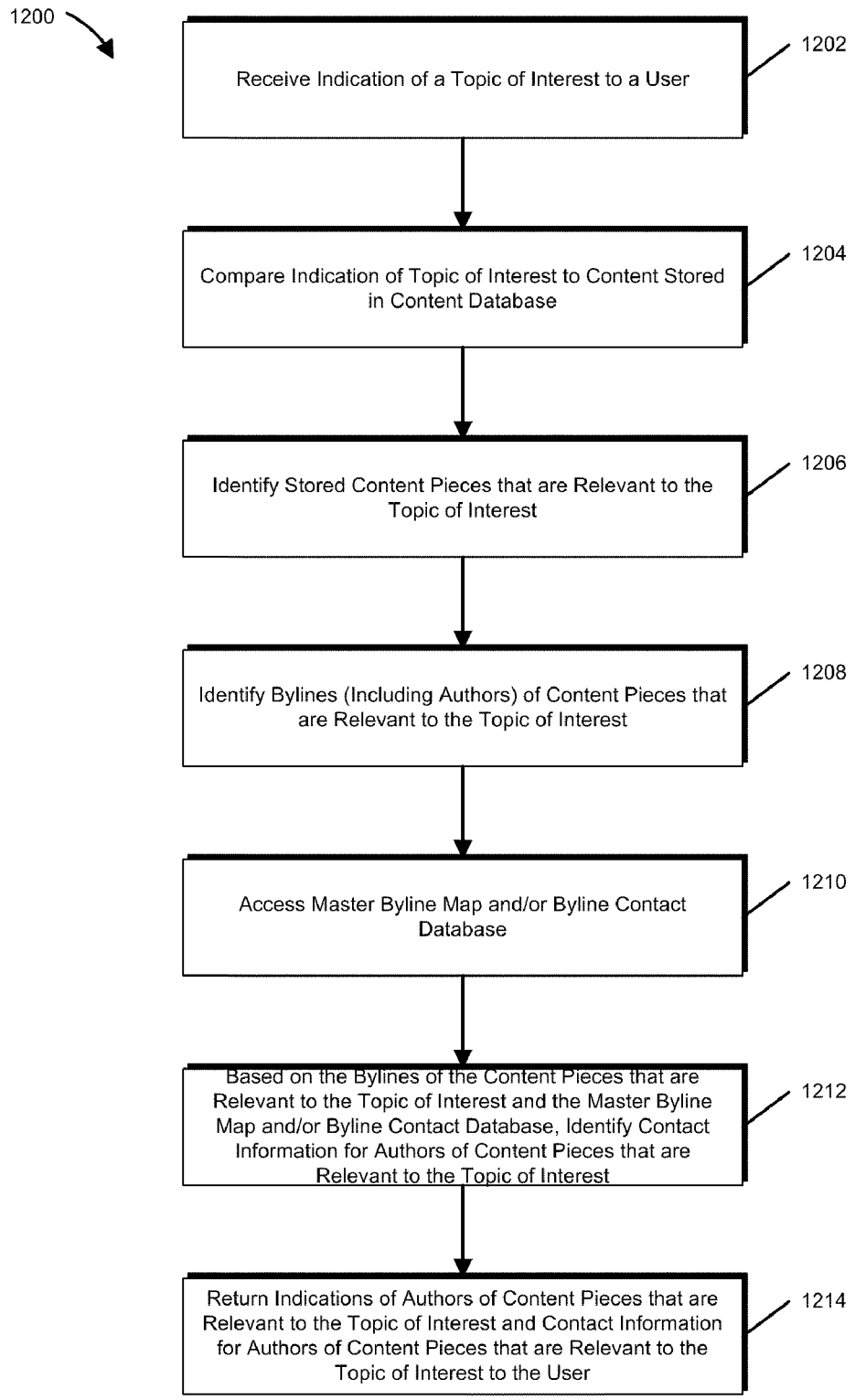
FIG. 12 is a flowchart of an example of a process for identifying both authors of pieces of content that are relevant to a user as well as contact information for the authors of the pieces of content that are relevant to the user.

FIG. 12 is a flowchart 1200 of an example of a process for identifying both authors of pieces of content that are relevant to a user as well as contact information for the authors of the pieces of content that are relevant to the user. The process outlined in the flowchart 1200 illustrated in FIG. 12 may be performed by one or more computer systems and may involve one or more of the components of system 300 illustrated in FIG. 3.

As illustrated in FIG. 12, the process begins by receiving an indication of a topic of interest to a user (1002). In some implementations, the indication of the topic of interest to a user may be received as a result of a user entering a textual description of a topic of interest into a graphical user interface made available to the user by a computing system. For example, the user may enter one or more keywords, a formatted search query, or a free text description (e.g., a press release) of a topic of interest to the user into a graphical user interface made available by a computing system.

After the indication of the topic of interest is received, the indication of the topic of interest is compared to the content stored in content database 314 (1204). In some implementations, the content stored in content database 314 may be indexed by indexing and search library 316, and the operation of comparing the content stored in content database 314 may involve comparing the indication of the topic of interest to the index made available by indexing and search library 316.

As a result of comparing the indication of the topic of interest to the content stored in content database 314, stored content pieces that are relevant to the topic of interest are identified (1206). In some implementations, relevancy scores may be assigned to each of the stored content pieces based on the extent to which each content piece is relevant to the topic of interest. In such implementations, only those content pieces that have relevancy scores exceeding some determined threshold level may be considered to be relevant to the topic of interest.

After the content pieces that are relevant to the topic of interest to the user have been identified, the bylines, including the authors, of the content pieces that are relevant to the topic of interest are identified (1208). In some cases, the operation of identifying the bylines of the content pieces that are relevant to the topic of interest may involve extracting the bylines (or perhaps only the names of the authors) from the content pieces that are relevant to the topic of interest from the versions of the content pieces stored in content database 314. Additionally or alternatively, the operation of identifying the bylines of the content pieces that are relevant to the topic of interest may involve extracting the Journalist_Map_Ids for the content pieces that are relevant to the topic of interest from the content pieces stored in content database 314.

Thereafter, one or both of the master byline map 324 and the byline contact database 330 are accessed (1210), and, contact information is identified for the authors of the content pieces that are relevant to the topic of interest (1212). For example, in some implementations, the Journalist_Map_Ids for the content pieces that are relevant to the topic of interest may be compared to the Journalist_Map_Ids for byline entries stored in one or both of master byline map 324 and byline contact database 330 to identify the byline entries stored in one or both of master byline map 324 and byline contact database 330 that correspond to the content pieces that are relevant to the topic of interest. Thereafter, contact information for the authors of the content pieces that are relevant to the topic of interest may be determined based on the byline entries stored in one or both of master byline map 324 and byline contact database 300 that correspond to the content pieces that are relevant to the topic of interest. Additionally or alternatively, in some implementations, contact information for one or more of the authors of the content pieces that are relevant to the topic of interest who work for recognized media outlets with editorial oversight may be identified by determining the Edname_Ids for the authors of the content pieces that are relevant to the topic of interest and then identifying contact information for the authors of the content pieces that are relevant to the topic of interest from media contact database 318 based on the determined Edname_Ids.

After identifying contact information for the authors of content pieces that are relevant to the topic of interest, indications of the authors of the content pieces that are relevant to the topic of interest and contact information for the authors of the content pieces that are relevant to the topic of interest are returned to the user. The user then may use this information to communicate with one or more of the authors of the content pieces that are relevant to the topic of interest.

Figure 13:
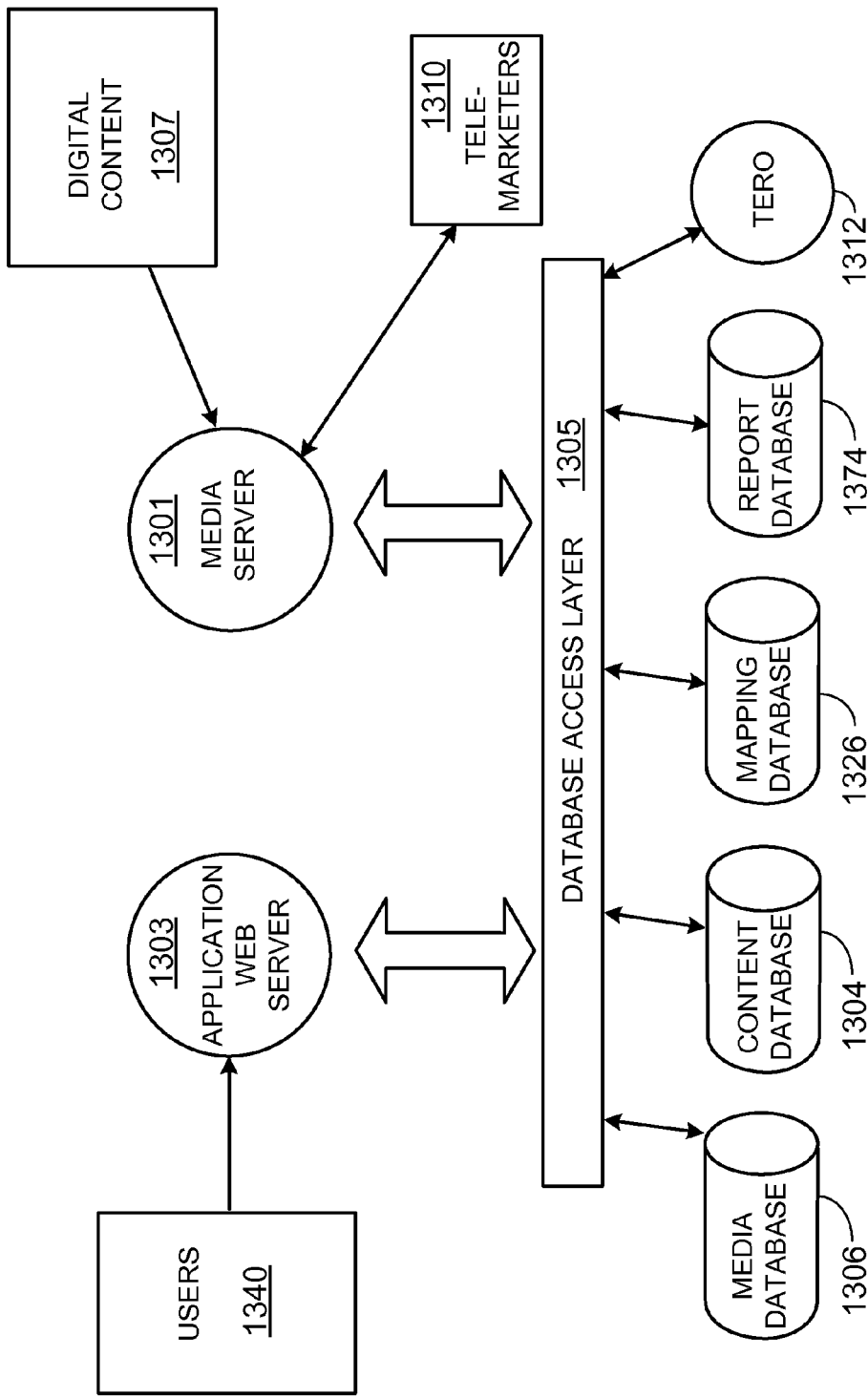
FIG. 13 represents a system for integrating, updating and searching various media data databases and building media lists and reports.

Referring to FIG. 13, a system for integrating, updating, and searching media databases and building media lists and reports includes Media Server (1301), Application Web Server (1303), Database Access Layer (1305), Content Database (1304), Media Database (1306), Mapping Database (1326), Report Database (1374), Tero (1312) and Telemarketers (1310).

Media Server (1301) receives Digital Content (1307) from several sources that are referred to as feeds. The sources of Digital Content (1307) (i.e., feeds) include, but are not limited to, content providers (such as LexisNexis®, Google™ News, etc.), media websites (including blogs), companies who "clip", scan, and compile print, online and broadcast content, TV sources wherein the content is available as transcripts, captured through closed captioning and stored digitally or captured and digitized by voice-to-text software, and radio sources wherein the content is available as transcripts or captured and digitized by voice-to-text software. Media Server (1301) reads and writes data from and to Content Database (1304), Media Database (1306), Mapping Database (1326), Report Database (1374) and Tero (1312) via Database Access Layer (1305).

Database Access Layer (1305) comprises commercially available programming interfaces and processes utilized by Media Server (1301) and Application Web Server (1303) to read and write data from and to the various databases.

Users (1340) include actual persons using a general computing device and/or remote devices configured to query Application Web Server (1303). The User's (1340) device, although not illustrated in FIG. 13, further includes software such as an operating system necessary for operation of the computer system and various applications and hardware such as central processing unit and hard disks. The User's (1340) device still further includes hardware (not shown) such as a modem, a Local Area Network (LAN) adapter, etc., for executing a data communication with Application Web Server (1303).

Application Web Server (1303) may incorporate various types of information servers including, for example, a world wide web ("WWW" or "web") server that provides web pages upon request. Application Web Server (1303) is connected to a communications network such as a local area network ("LAN"), a wide area network ("WAN"), a public network, a private network, a virtual private network, a wired network, a wireless network, or various other types of communication networks. The function of the communication network is to carry content between Application Web Server (1303) and Users (1340).

In certain representative examples provided below, the system is used to build a media list and report that contains, in addition to other information, the names and details for particular journalists, including the identification of any relevant articles or media content the journalist authored. However, as described with respect to FIGS. 17 and 20-23, the system can also be used to build a media list and report that contains the names of and details for particular blogs and/or bloggers.

As shown in FIG. 13, Content Database (1304) receives each article of Digital Content (1307) in a feed from Media Server (1301) via Database Access Layer (1305) and stores the article according to its normalized schema (e.g., by byline, headline, summary, publishing time, etc.).

Media Database (1306) receives each journalist and corresponding media outlet information of Digital Content (1307) in a feed from Media Server (1301) via Database Access Layer (1305) and stores such journalist and media outlet information according to its normalized schema (i.e. outlet name, journalist name, title, beat, type of publication, outlet contact information, journalist contact information, etc.).

Mapping Database (1326) stores mappings between bylines and source outlets of articles in the Content Database (1304) and journalists and media outlets in the Media Database (1306) via Database Access Layer (1305).

Tero (1312) maintains an index of current media Digital Content (1307). Tero (1312) is any commercially available indexing software that can analyze and index the text and support many different native languages, some currently available packages support up to 80 languages.

Communication channel(s) to and from, and/or among, Users (1340), Application Web Server (1303), Database Access Layer (1305), Digital Content (1307), Media Server (1301), Media Database (1306), Content Database (1304), Mapping Database (1326), Report Database (1374) and Tero (1312) transmit the electronic data in a timely fashion throughout the system. The communication channel(s) may be any one of local area network (LAN), wide area network (WAN), wireless application protocol (WAP), dedicated lines, satellite or any other device or system for transmitting electronic data in a timely fashion.

Although one User (1340), Application Web Server (1303), Database Access Layer (1305), Digital Content (1307), Media Server (1301), Media Database (1306), Content Database (1304), Mapping Database (1326), Report Database (1374) and Tero (1312) are shown, it is understood that any number of users, Application Web Servers, Database Access Layers, Digital Content sources, Media Servers, Media Databases, Content Databases, Mapping Databases, Report Databases and Tero devices may be embodied in accordance with the invention.

Figure 14:
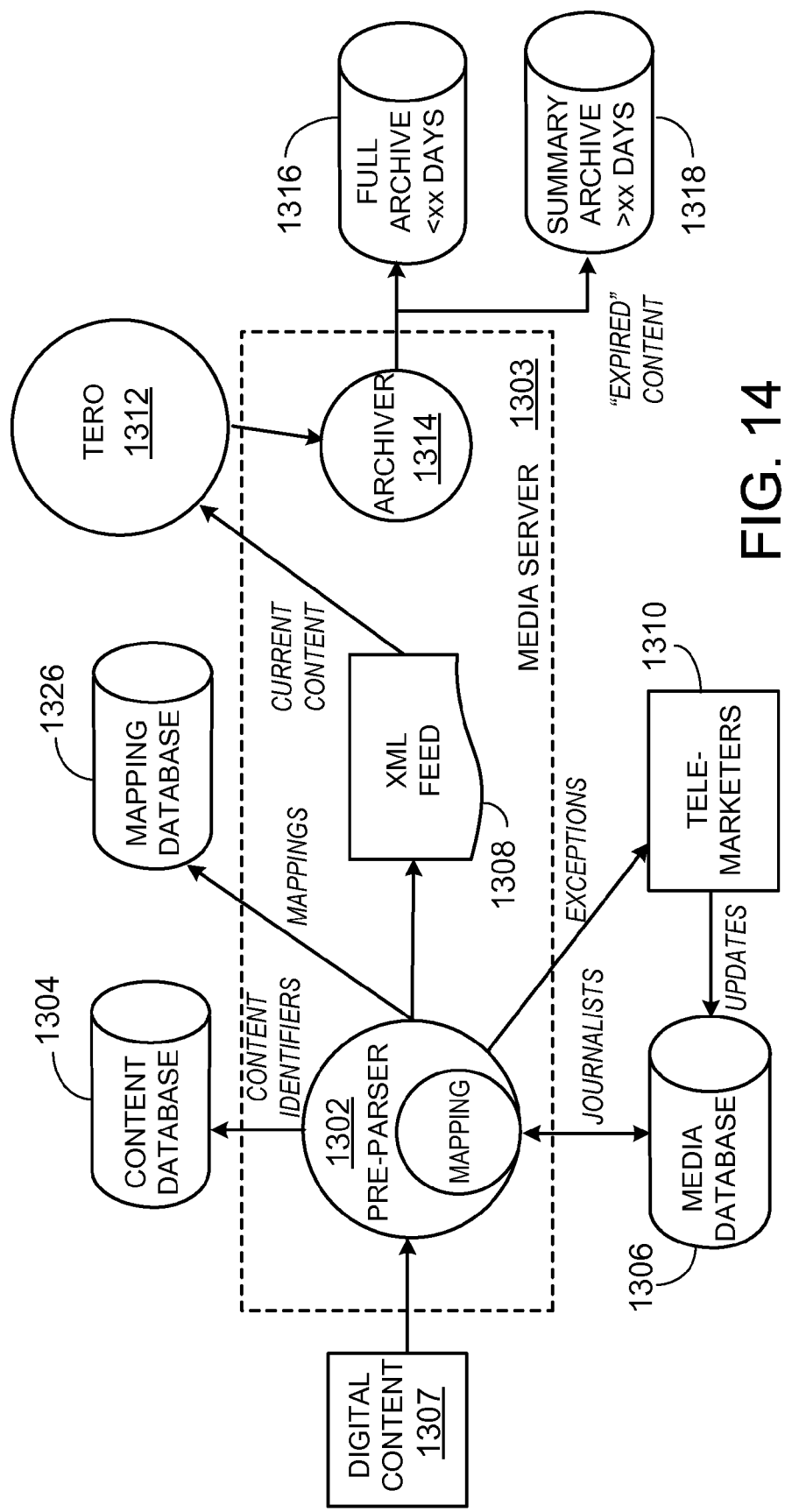
FIG. 14 represents a detailed depiction of the media server of the system of FIG. 13.

Referring to FIG. 14, the Media Server (1301) of FIG. 13 further includes Pre-Parser (1302), XML feed (1308), Tero (1312), and Archiver (1314).

Pre-Parser (1302) of Media Server (1301) receives Digital Content (1307) in various formats (i.e., XML, ASCII delimited, proprietary tagged formats) and delivery methodologies (i.e. push and pull methods) based on content source examples. Pre-Parser (1302) receives each feed and parses out the relevant elements of the content data (i.e. Headlines, bylines, dates, content body, etc.). Pre-Parser (1302) sends the parsed elements to Mapping Module (1322) and ultimately converts the feed to XML format (1308) to be forwarded to Tero (1312) for indexing and Archiver (1314) for archiving.

Pre-Parser (1302) sends Digital Content (1307) to be stored to Content Database (1304).

Pre-Parser (1302) queries and updates the Mapping Database (1326) as it processes articles of Digital Content (1307). As a result of the mapping processes, Pre-Parser (1302) generates two outputs: (i) a normalized XML feed (1308) for the Tero (1312) and a set of exception reports for Telemarketers (1310) research.

Tero (1312) maintains an index of current media content. Archiver (1314) manages the Tero content and removes expired content. Archiver (1314) keeps a full archive (1316) of all content for XX days and a Summary Archive (1318) with full text removed for >XX days (XX is determined by a number of factors related to business needs and licensing constraints. XX is not a technical limitation).

Figure 15:
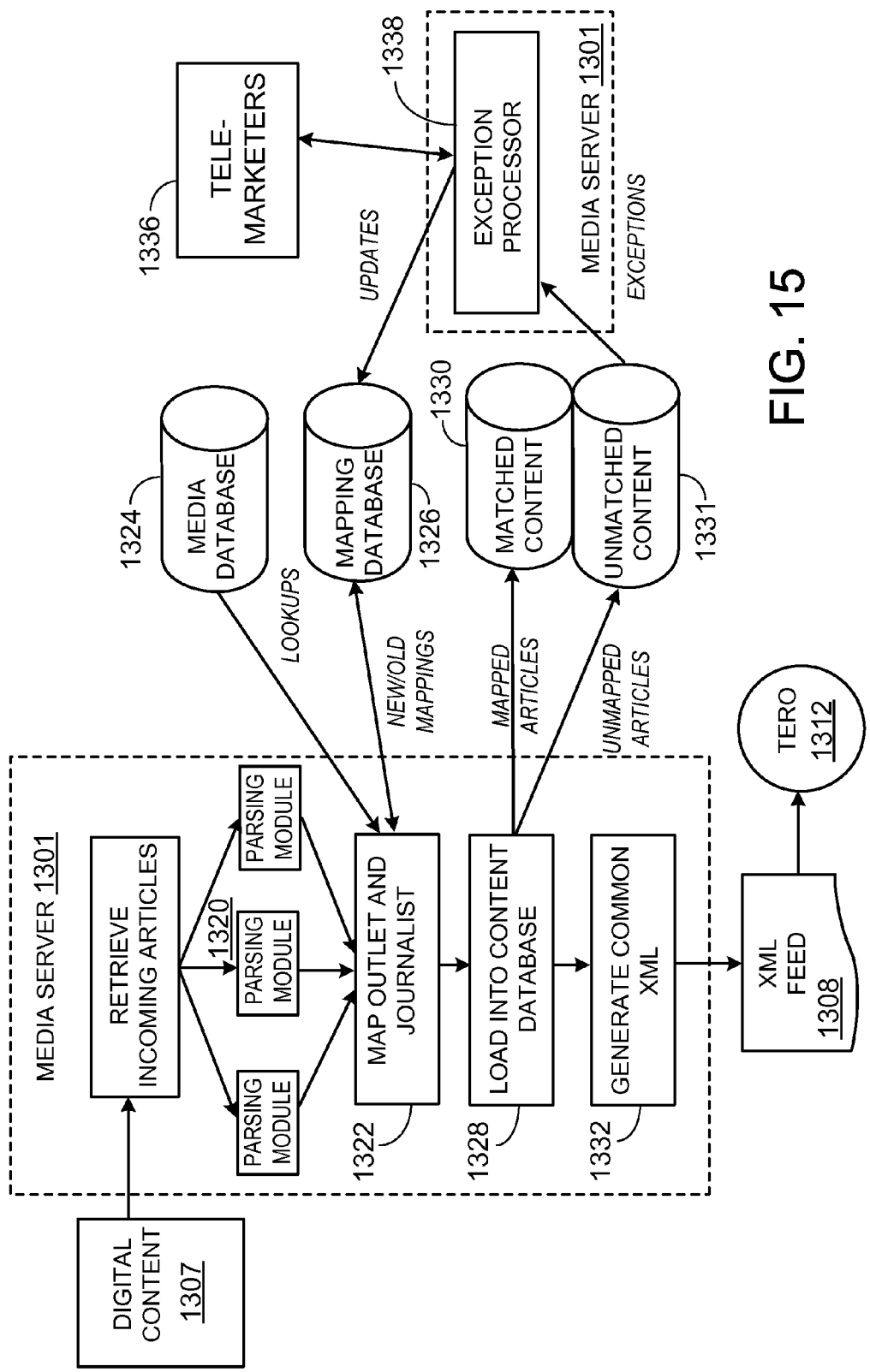
FIG. 15 represents a detailed depiction of the pre-parser of the media server of FIG. 14.

FIG. 15 provides a detailed depiction of Pre-Parser (1303) shown in FIG. 14. Referring to FIG. 15, Pre-Parser (1302) receives each Digital Content (1307) feed in the various formats and delivery methodologies and passes each Digital Content (1307) feed through the appropriate parsing module (1320) to Mapping Module (1322).

Mapping Module (1322) compares the received feed to existing mapping information stored in Mapping Database (1326). If the received feed does not match any of the existing mapping information, Mapping Module (1322) attempts to identify new mapping that is to be stored in Mapping Database (1326).

After the mapping process, Pre-Parser (1302) loads the digital content article via Mapping Module (1322) into either the Matched Content Database (1330) of Content Database (1304) for articles with mapped journalists, or the Unmatched Content Database (1331) of Content Database (1304) for articles that could not be mapped to journalists.

The Exceptions Processor (1338) pulls data from the Unmatched Content Database (1331) and formats a call down project for the Telemarketers (1336). The Telemarketers (1336) process and update the unmatched content data and send the updated data to Mapping Database (1326). Mapping Database (1326) forwards the updated data to Mapping Module (1322), which loads the updated data into Content Database (1304).

Pre-Parser (1302) then generates a normalized XML file (1332) of the digital content article for processing by Tero (1312). The XML file (1332) is sent to XML feed (1308) which passes the XML file (1332) to Tero (1312).

Figure 16:
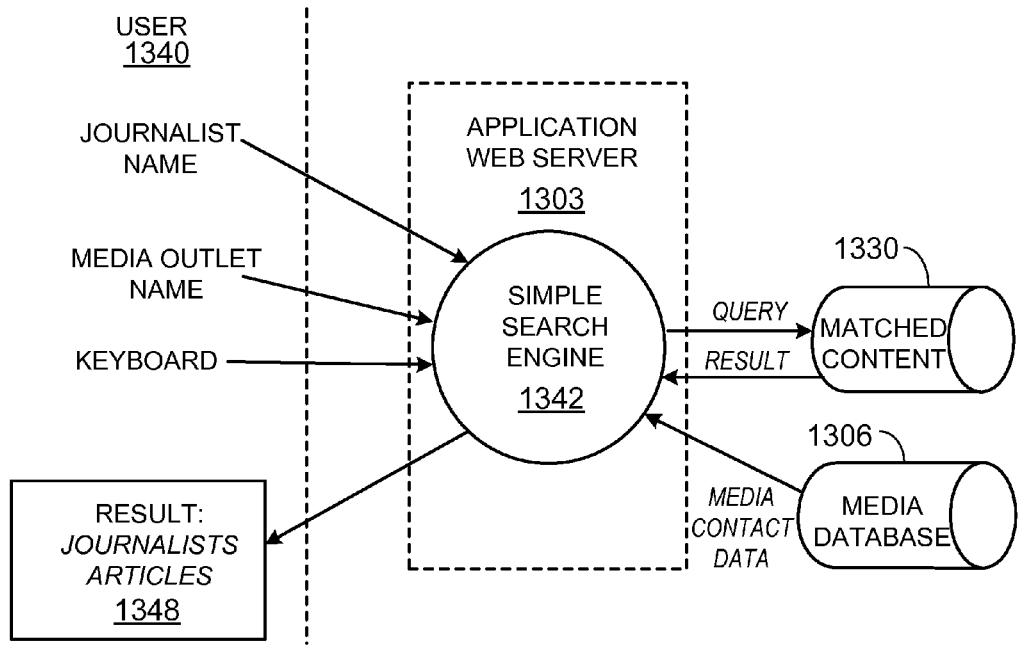
FIG. 16 represents methods for conducting a media content and/or media contact search using the application server of the system of FIG. 13.

Referring to FIG. 16, User (1340) conducts a search by accessing Simple Search Engine (1342) of Application Web Server (1303) from any workstation using a supported Web browser. Simple Search Engine (1342) provides User (1340) with a web page on which to enter various search criteria. The User (1340) can enter any of the following search criteria (i) Journalist Name (ii) Media Outlet Name or (iii) keyword. The Search Criteria and Search Type are then passed to Simple Search Engine (1342). Simple Search Engine (1342) creates a query and compares the query data to data in the Matched Content Database (1330). The results are returned to the Simple Search Engine (1342) with the article contents and the identifiers of the media outlet and journalist mapped for the related article. The Simple Search Engine (1342) queries the Media Database (1346) for media contact data about the media outlet and journalist and then provides the results of the search to the user as a formatted web page (1348) with links to more detailed information.

Figure 17:
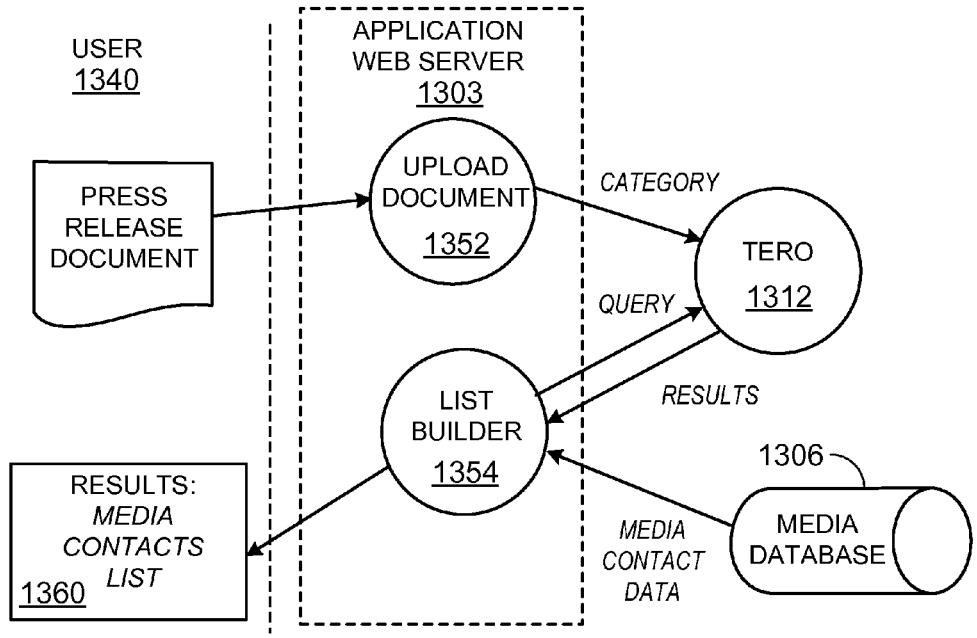
FIG. 17 represents methods for building media lists using the application server of the system of FIG. 13.

Referring to FIG. 17, User (1340), such as a public relations professional accessing Application Web Server (1303), can build a media list as a Web Page. FIGS. 20-23 provide a representative example of how a public relations professional can use a web page or browser to build a media list and should be referred to in conjunction with FIG. 17 in the discussion that follows.

User (1340) can build the media list by inputting into the web page a press release ("target") on a given topic rather than journalist search criteria. Simple Search Engine (1342) of Application Web Server (1303) can then conduct a MCD search, match the target to all articles in the digital content that match the subject of the target, return to the User (1340) a media list containing the names of all journalists (1390) and blogs (1392) that have recently written on the same topic as the target press release, and provide the User (1340) with the ability to view each journalist's and/or blog's recent writing history or content.

Referring to FIG. 17 and FIGS. 20-23, User (1340) accesses Application Web Server (1303) to (i) upload a press release document or (ii) cut and paste the content of a press release document (1350) into the web page. The Upload Doc (1352) module of Application Web Server (1303) creates a new category in Tero (1312) using a Tero Application Processing Index (Tero API) and sets the User's (1340) press release document as the Training Document for this press release. Tero (1312) uses this training document to seed the category (i.e., search for articles with a predefined percentage of content) with the list of relevant documents.

Figure 20:
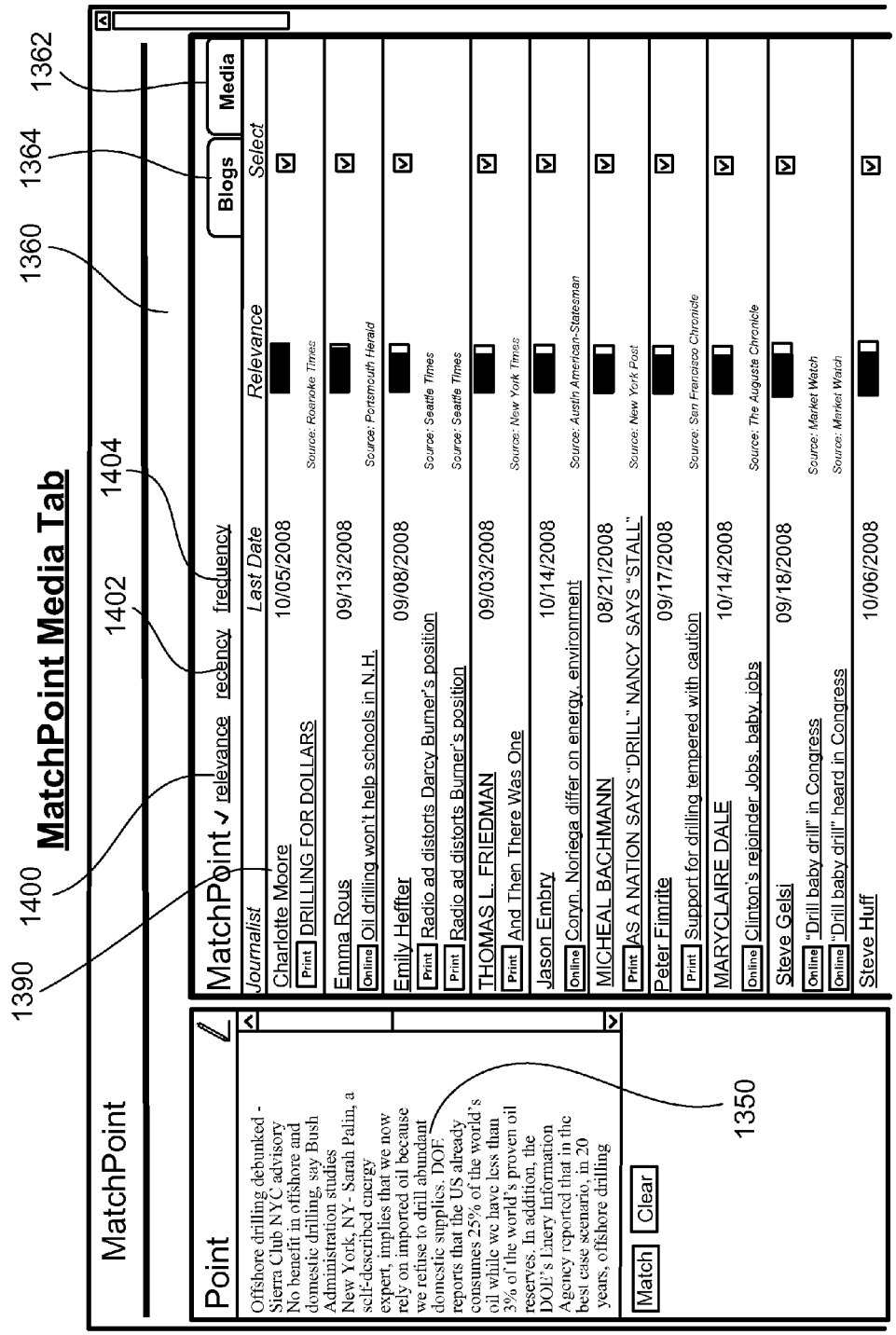
FIG. 20 provides a screen shot of a web page based user search which includes at least a portion of a press release and a results report listing journalists and their associated articles that match the press release.

ListBuilder (1354) of Application Web Server (1303) queries Tero (1312) for a list of all articles, including each mapped journalist or blog identity in the newly created category. In certain constructions, ListBuilder (134) sorts the list by relevance, applies filtering as needed, and then looks up the media contact information for each article from the Media Database (1306). ListBuilder (1354) presents the resulting list to User (1340) as a formatted web page (1360) with links to more detailed information. For example, as shown in FIG. 20, if the media contact tab (1362) has been selected, User (1340) can click on a journalist's name (1390) to view a Journalist Detail report or a list (1396) of recent headlines or storylines authored by the journalist. If the blog tab (1364) has been selected, the User (1340) can also click on a particular blog (1392) to review the discussion contained therein. Subsequent clickthroughs on an article appearing on the list (1396) for example, provide the User (1340) with an abstract of each article and further clickthroughs (See FIG. 23) provide the User (1340) with a stored copy of the entire article (1394).

Figure 21:
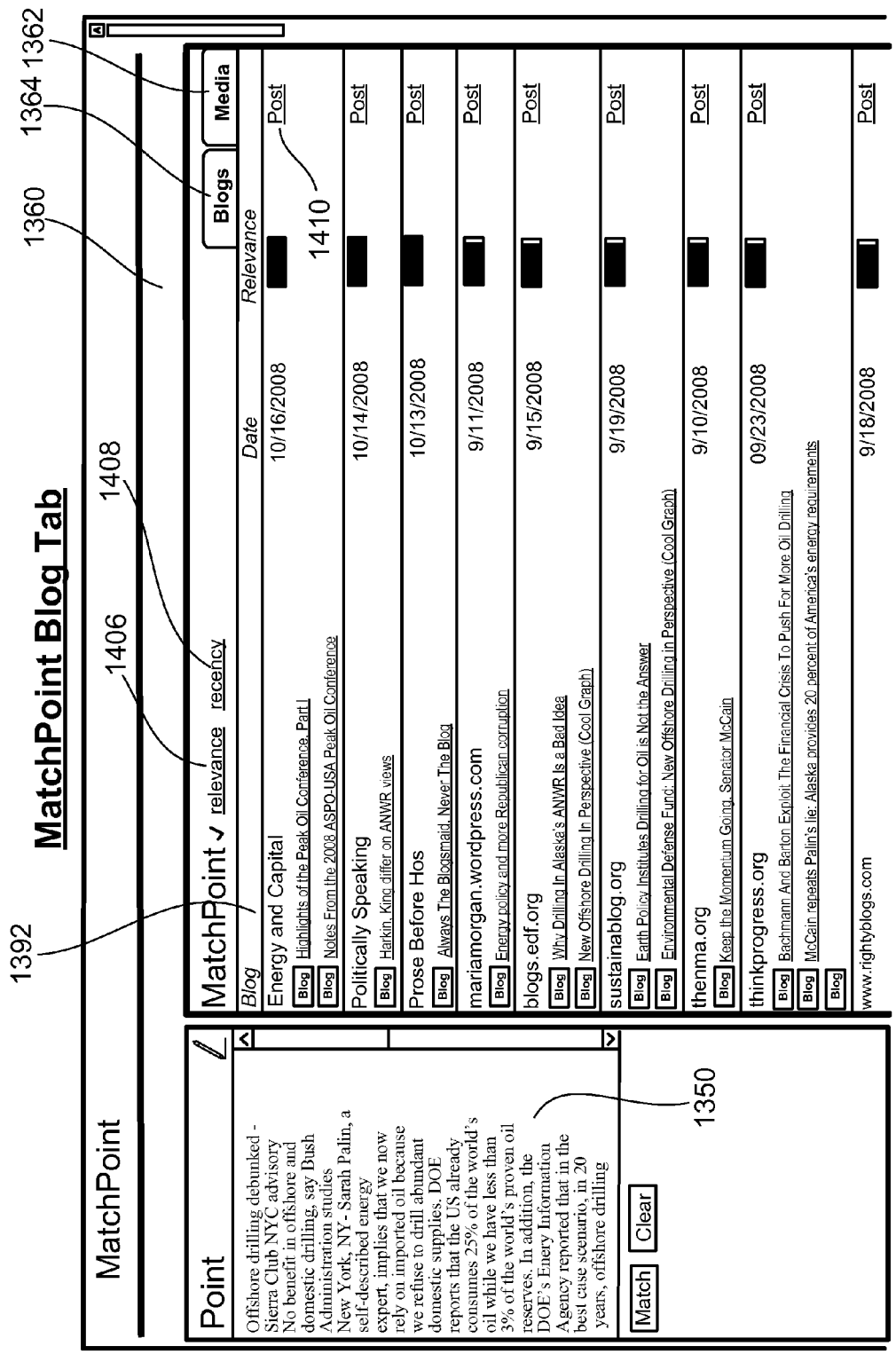
FIG. 21 provides a screen shot of a web page based user search which includes at least a portion of a press release and a results report listing blogs sites and their associated blogs that match the press release.
Figure 22:
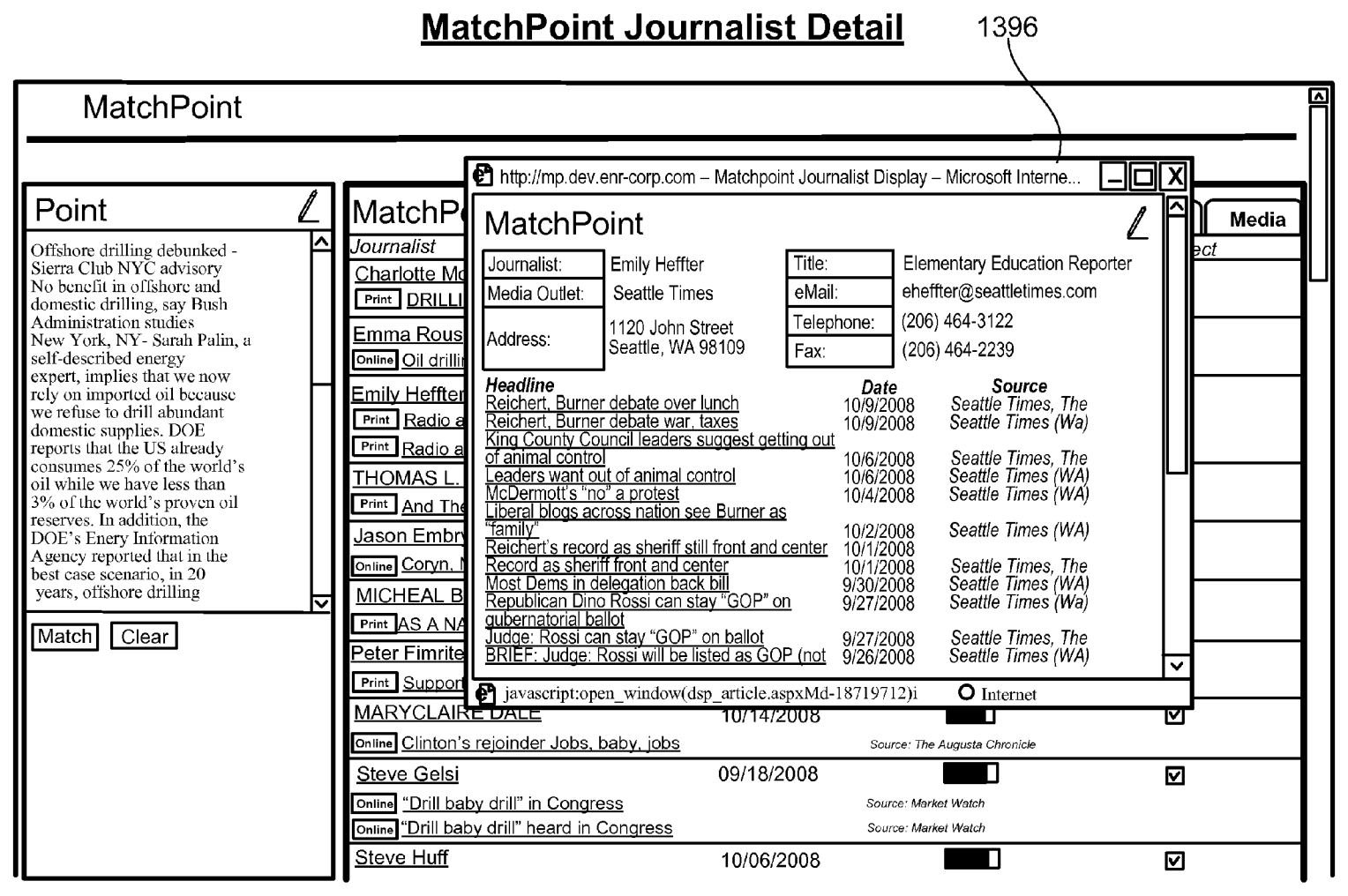
Figure 23:
FIG. 23 provides a screen shot of an article detail report that includes at least a portion of the text for a selected article.

As shown in FIGS. 20-23, the web site can provide the User (1340) with a variety of ways to format a report. For example, buttons 1400, 1402 and 1404, respectively provide the User (1340) with the ability to format the journalist report based on relevancy, recency (i.e., how current is the listed article) or frequency (i.e., which journalists write most frequently in a selected area). As shown in FIG. 21, buttons 1406 and 1408 allow the blog report to be formatted based on relevance and recency. Moreover, the web page can include a button 1410, which when selected allows the User (1340) to post a response to the blog.

Figure 18:
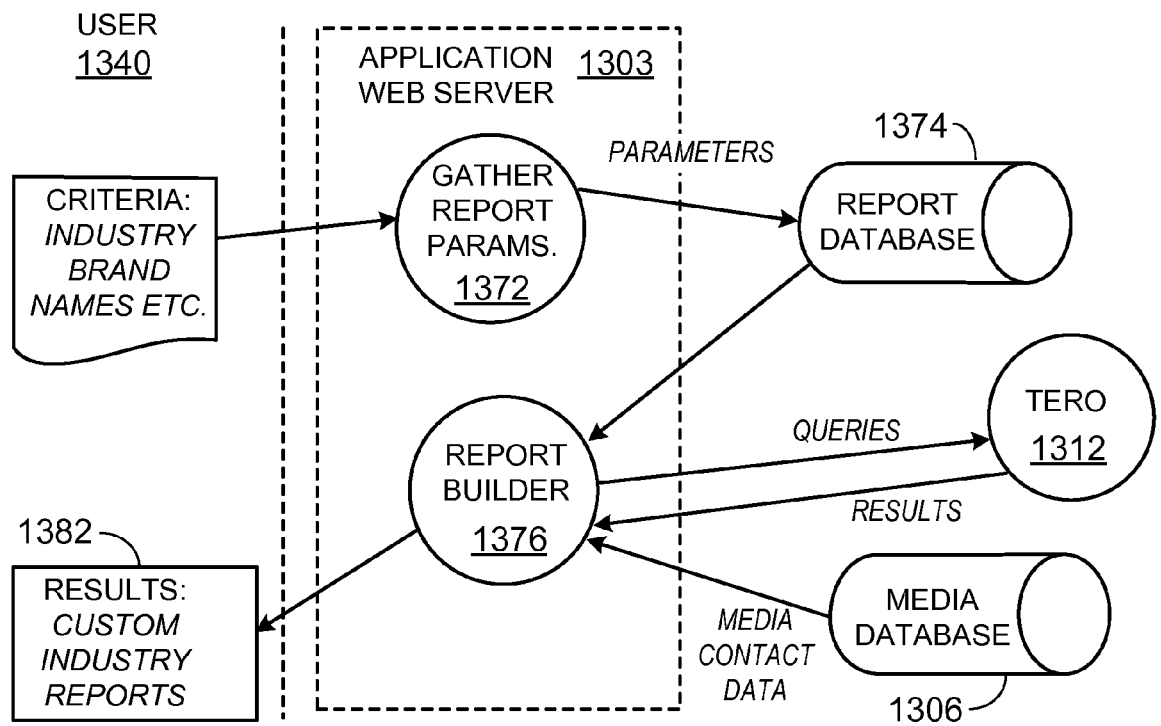
FIG. 18 represents a method for building media reports using the application server of the system of FIG. 13.

Referring to FIG. 18 which describes a further query technique in which User (1340) can access Application Web Server (1303) to generate a custom industry report. User (1340) accesses a system web page of Application Web Server (1303) and enters criteria (1370) such as Industry, Brand Names, Date Range etc. to be included in a report request. Gather Reports (1372) of Application Web Server (1303) parses the User's (1340) input and generates a standard report request to be stored in the Report Database (1374).

Report Builder (1376) a processor of Application Web Server (1303) receives the standard requests from the Report Database (1374) and formats queries against Tero (1312). Tero (1312) returns the results for the queries which include statistics and supporting articles to Report Builder (1376). Report Builder (1376) takes the data from the Tero queries and data from Media Database (1306) and provides this data to User (1340) as a formatted web page with Custom Industry Reports (1382) and links to more detailed information.

Figure 19:
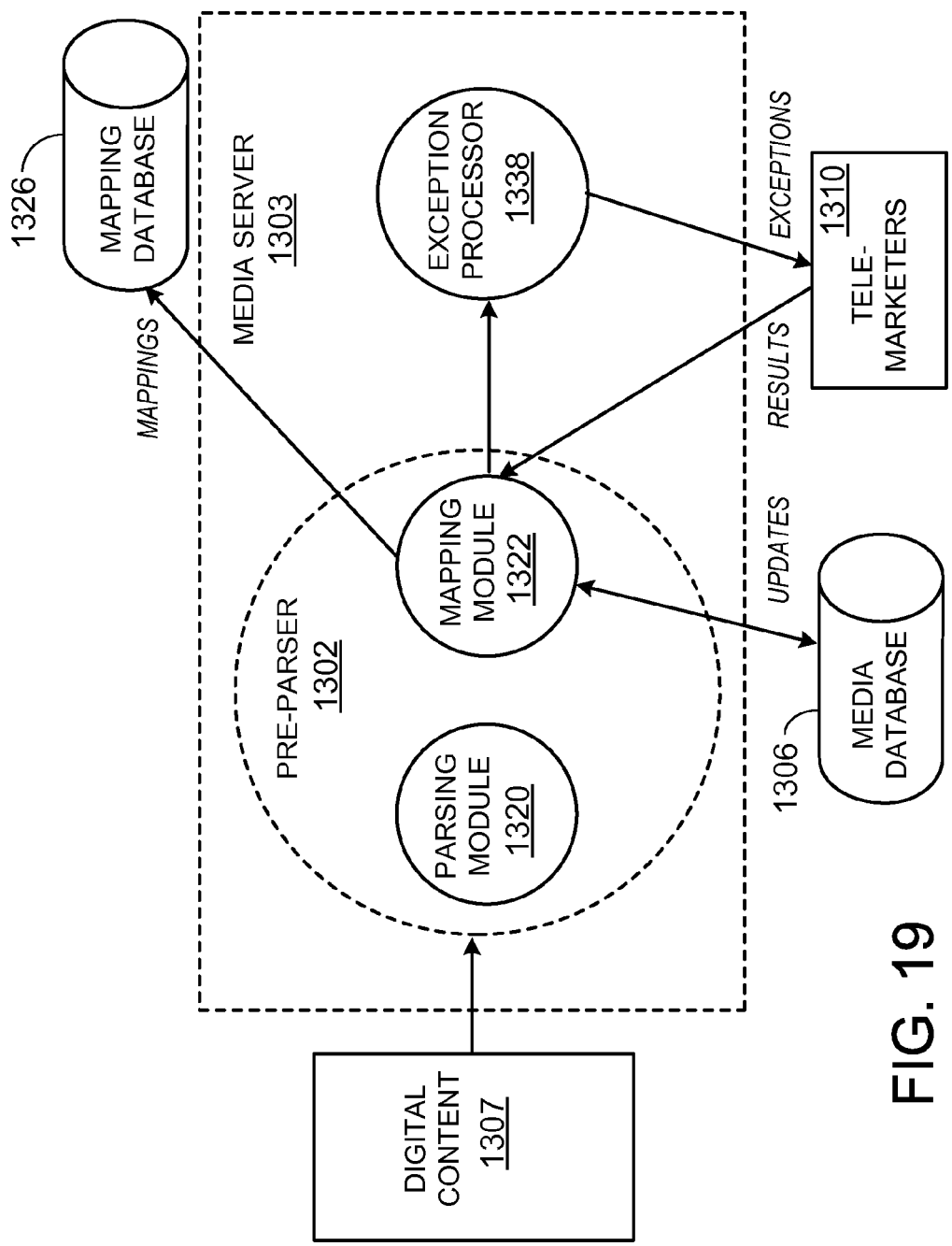
FIG. 19 represents a method for updating the media contact database using the media server of FIG. 14.

Referring to FIG. 19, Pre-Parser (1302) receives Digital Content (1307) from several sources or feeds. The relevant Parsing Module (1320) of Pre-Parser (1302) parses the Digital Content (1307) article and identifies each Digital Content (1307) article including but not limited to media outlet "Source", "Headline", "Section" (where broadcast or print edition of the Digital Content (1307) article was found).

Pre-Parser (1302) then sends the fields parsed from each piece of Digital Content (1307) to a Mapping Module (1322) that determines the mapping between the articles "Source" and "Byline" and the Media Databases (1324) "media outlet" and "journalist". The Mapping Module (1322) uses the Mapping Database (1326) to determine if a mapping already exists or uses a series of algorithms to identify a new mapping.

When a match is found, the Section is used to confirm or update the Journalist's beat or coverage data. The Journalist is marked as "ACTIVE" in the Mapping Database (1326).

When a Journalist match is found at a different source, the possible alternate source is noted and the Journalist is marked as "REQUIRES UPDATE" in the Mapping Database (1326).

When no Journalist match is found at all, the Journalist and Source pair are marked as "NEW" and placed in the daily exception report in the Mapping Database (1326).

The REQUIRES UPDATE and NEW exception reports are sent to the Exceptions Processor (1338) for processing to remove duplicates and then sent to Telemarketers (1310) for updating. Telemarketers (1310) are provided with contact information for the Source and all the parsed information available for a Journalist. Telemarketers (1310) use a customized script to obtain and update the relevant contact and beat information for the Journalist.

Telemarketers (1310) make the necessary calls and return the updated information, for example, within a 24-hour time period. Journalists that are not updated in this period are kept longer for further research and updating.

The updated data is processed by Mapping Module (1322) and used to update Media Database (1306). The Journalist records in the Media Database (1306) are marked with an appropriate update date.

As will be appreciated from the above discussion, in some but not necessarily all implementations, an author's (e.g., a journalist's or blogger's) output text is analyzed to determine the individual's current focus. In other words, a journalist's or blogger's subject area of interest is determined according to the topics of the stories he actually writes.

Additionally or alternatively, in some but not necessarily all implementations, a media contact database updating process produces a substantial improvement in the currency and accuracy of the media contact database at a substantial reduction in cost.

The described systems, methods, and techniques may be implemented in digital electronic circuitry, computer hardware, firmware, software, or in combinations of these elements. Apparatuses embodying these techniques may include appropriate input and output devices, a computer processor, and a tangible computer-readable storage medium on which a computer program or other computer-readable instructions are stored for execution by one or more processing devices (e.g., a programmable processor).

A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Suitable processors include, by way of example, both general and special purpose microprocessors. Generally, a processor will receive instructions and data from a read-only memory and/or a random access memory. Storage devices suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed application-specific integrated circuits (ASICs).

Various modifications may be made. For example, useful results still may be achieved if operations of the disclosed techniques are performed in a different order and/or if components of the disclosed systems are combined in a different manner and/or replaced or supplemented by other components.

What is claimed is:

1. A computer-implemented method for identifying contact information for an author of content that is relevant to a topic of interest to a user, the method comprising:

receiving, by one or more processors at a first computing system and from a second computing system that is distinct from the first computing system, an indication of a topic of interest to a user;

accessing, from a computer memory storage system, multiple pieces of content;

in response to receiving the indication of the topic of interest, comparing the indication of the topic of interest to the multiple pieces of content accessed from the computer memory storage system;

based on results of comparing the indication of the topic of interest to the multiple pieces of content accessed from the computer memory storage system, identifying a piece of content as being relevant to the topic of interest, wherein identifying a piece of content as being relevant to the topic of interest includes:

identifying a first piece of content as being relevant to the topic of interest, and identifying a second piece of content as being relevant to the topic of interest, the second piece of content being different from the first piece of content;

in response to identifying the piece of content as being relevant to the topic of interest, identifying an identifier for an author of the piece of content identified as being relevant to the topic of interest, wherein identifying an identifier for an author of the piece of content identified as being relevant to the topic of interest includes:

identifying a byline for the first piece of content, the byline for the first piece of content specifying an identifier for an author who authored the first piece of content and a first media outlet in which the first piece of content appeared, and identifying a byline for the second piece of content, the byline for the second piece of content specifying an identifier for an author who authored the second piece of content and a second media outlet in which the second piece of content appeared, the second media outlet being different from the first media outlet and the identifier for the author who authored the second piece of content being the same as the identifier for the author who authored the first piece of content;

accessing, from the computer memory storage system, contact information for each of multiple authors including identifiers therefor;

comparing the identifier for the author to the identifiers included in the accessed contact information;

based on results of comparing the identifier for the author to the identifiers included in the accessed contact information, identifying contact information corresponding to the author from within the accessed contact information, wherein identifying contact information corresponding to the author from within the accessed contact information includes identifying contact information at the first media outlet corresponding to the author; and returning, to the second computing system, an indication of the identity of the author and at least some of the identified contact information corresponding to the author, wherein returning, to the second computing system, at least some of the identified contact information corresponding to the author includes returning, to the second computing system, at least some of the identified contact information at the first media outlet corresponding to the author.

2. The method of claim 1 wherein:
identifying contact information corresponding to the author from within the accessed contact information includes identifying an e-mail address for the author; and
returning, to the second computing system, at least some of the identified contact information corresponding to the author includes returning, to the second computing system, the e-mail address identified for the author.

3. The method of claim 1 wherein:
identifying contact information corresponding to the author from within the accessed contact information includes identifying at least one of a telephone number, a mailing address, and a facsimile number for the author; and
returning, to the second computing system, at least some of the identified contact information for the author includes returning, to the second computing system, at least one of a telephone number, a mailing address, and a facsimile number for the author.

4. The method of claim 1 further comprising:
returning, to the second computing system, an indication of the piece of content identified as being relevant to the topic of interest;
in response to returning, to the second computing system, an indication of the piece of content identified as being relevant to the topic of interest, receiving, from the second computing system, a request for the piece of content identified as being relevant to the topic of interest; and
in response to receiving the request for the piece of content identified as being relevant to the topic of interest, returning, to the second computer, at least a portion of the piece of content identified as being relevant to the topic of interest.

5. The method of claim 1 wherein:
returning, to the second computing system, at least some of the identified contact information at the first media outlet corresponding to the author includes returning, to the second computing system, at least some of the identified contact information at the first media outlet corresponding to the author without returning contact information at the second media outlet corresponding to the author.

6. The method of claim 1 wherein:
the piece of content identified as being relevant to the topic of interest includes a byline specifying an identifier for the author of the piece of content and a media outlet in which the piece of content appeared;
identifying an identifier for the author of the piece of content identified as being relevant to the topic of interest includes identifying a unique identifier for the byline for the piece of content identified as being relevant to the topic of interest;
accessing, from a computer memory storage system, contact information for each of multiple authors includes accessing, from the computer memory storage system, database entries that link unique identifiers for bylines of individual pieces of content to corresponding contact information for the authors of the individual pieces of content;
comparing the identifier for the author to the identifiers included in the accessed contact information includes comparing the unique identifier for the byline for the piece of content identified as being relevant to the topic of interest to the unique identifiers for bylines included within the accessed database entries; and
identifying contact information corresponding to the author from within the accessed contact information based on results of comparing the identifier for the author to the identifiers included in the accessed contact information includes:
determining that the unique identifier for the byline for the piece of content identified as being relevant to the topic of interest matches a particular one of the unique identifiers for bylines included within the accessed database entries, and
identifying the contact information to which the particular one of the unique identifiers is linked by the database entries as contact information for the author.

7. The method of claim 1 wherein:
identifying an identifier for the author of the piece of content identified as being relevant to the topic of interest includes identifying an actual name of the author of the piece of content identified as being relevant to the topic of interest;
accessing, from a computer memory storage system, contact information for each of multiple authors including identifiers therefor includes accessing contact information for each of multiple authors including actual names therefor;
comparing the identifier for the author to the identifiers included in the accessed contact information includes comparing the actual name for the author of the piece of content to the actual names included within the accessed contact information; and
identifying contact information corresponding to the author from within the accessed contact information based on results of comparing the identifier for the author to the identifiers included in the accessed contact information includes identifying contact information corresponding to the author from within the accessed contact information based on results of comparing the actual name for the author to the actual names included in the accessed contact information.

8. The method of claim 1 wherein:
receiving, at the first computing system and from the second computing system, an indication of a topic of interest to a user includes receiving, at the first computing system and from the second computing system, at least a portion of a press release related to a promotional campaign;

comparing the indication of the topic of interest to the multiple pieces of content accessed from the computer memory storage system includes comparing the portion of the press release to the multiple pieces of content accessed from the computer memory storage system; and identifying a piece of content as being relevant to the topic of interest based on results of comparing the indication of the topic of interest to the multiple pieces of content accessed from the computer memory storage system includes identifying a piece of content as being relevant to the topic of interest based on results of comparing the portion of the press release to the multiple pieces of content accessed from the computer memory storage system.

9. The method of claim 1 wherein:

accessing, from a computer memory storage system, multiple pieces of content includes accessing, from the computer memory storage system, an index of multiple pieces of content;

comparing the indication of the topic of interest to the multiple pieces of content accessed from the computer memory storage system includes searching the index for content that matches at least a portion of the indication of the topic of interest; and identifying a piece of content as being relevant to the topic of interest based on results of comparing the indication of the topic of interest to the multiple pieces of content accessed from the computer memory storage system includes identifying a piece of content as being relevant to the topic of interest based on results of searching the index for content that matches at least a portion of the indication of the topic of interest.

10. The method of claim 9 wherein:

accessing, from the computer memory storage system, an index of multiple pieces of content includes accessing, from the computer memory storage system, an index of topics of the multiple pieces of content;

searching the index for content that matches at least a portion of the indication of the topic of interest includes searching the index of topics of the multiple pieces of content for topics that match the indication of the topic of interest; and identifying a piece of content as being relevant to the topic of interest based on results of searching the index for content that matches at least a portion of the indication of the topic of interest includes identifying a piece of content as being relevant to the topic of interest based on results of searching the index of topics of the multiple pieces of content for topics that match the indication of the topic of interest.

11. The method of claim 1 wherein:

receiving, at the first computing system and from the second computing system, an indication of a topic of interest to a user includes receiving, at the first computing system and from the second computing system, one or more keywords;

comparing the indication of the topic of interest to the multiple pieces of content accessed from the computer memory storage system includes comparing the one or more keywords to the multiple pieces of content accessed from the computer memory storage system; and identifying a piece of content as being relevant to the topic of interest based on results of comparing the indication of the topic of interest to the multiple pieces of content accessed from the computer memory storage system includes identifying a piece of content as being relevant to the topic of interest based on results of comparing the one or more keywords to the multiple pieces of content accessed from the computer memory storage system.

12. The method of claim 1 further comprising:

as a consequence of having identified the author who authored the piece of content identified as being relevant to the topic of interest, identifying, from within a computer memory storage system, additional pieces of content that were not determined to be relevant to the topic of interest but that were authored by the author who authored the piece of content identified as being relevant to the topic of interest;

returning, to the second computing system, an indication of the piece of content identified as being relevant to the topic of interest; and returning, to the second computing system, indications of at least some of the additional pieces of content that were not determined to be relevant to the topic of interest but that were authored by the author who authored the piece of content identified as being relevant to the topic of interest.

13. A system comprising:

one or more processors; and a non-transitory computer-readable storage system storing instructions that, when executed by the one or more processors, cause the system to:

receive, at the system and from another computing system that is distinct from the system, an indication of a topic of interest to a user;

access, from a computer memory storage system, multiple pieces of content;

in response to receiving the indication of the topic of interest, compare the indication of the topic of interest to the multiple pieces of content accessed from the computer memory storage system;

based on results of comparing the indication of the topic of interest to the multiple pieces of content accessed from the computer memory storage system, identify a piece of content as being relevant to the topic of interest;

in response to identifying the piece of content as being relevant to the topic of interest, identify an identifier for an author of the piece of content identified as being relevant to the topic of interest, wherein identifying an identifier for an author of the piece of content identified as being relevant to the topic of interest includes identifying a byline for the piece of content, the byline specifying an identifier for the author of the piece of content and a first media outlet in which the piece of content appeared;

access, from the computer memory storage system, contact information for each of multiple authors including identifiers therefor;

compare the identifier for the author to the identifiers for the authors included within the accessed contact information;

based on results of comparing the identifier for the author to the identifiers for the authors included within the accessed contact information, identify contact information corresponding to the author from within the accessed contact information, wherein identifying contact information corresponding to the author from within the accessed contact information includes identifying contact information corresponding to the author that specifies that the author is affiliated with a second media outlet that is different than the first media outlet, the identified contact information corresponding to the author including contact information at the second media outlet corresponding to the author;

return, to the other computing system, an indication of the identity of the author and at least some of the identified contact information corresponding to the author, wherein returning, to the other computing system, at least some of the identified contact information corresponding to the author includes returning, to the other computing system, at least some of the identified contact information at the second media outlet corresponding to the author;

return, to the other computing system, an indication of the piece of content identified as being relevant to the topic of interest, return, to the other computing system, an indication that the piece of content identified as being relevant to the topic of interest appeared in the first media outlet, and return, to the other computing system, an indication that the author is affiliated with the second media outlet.

14. A computer-implemented method for identifying contact information for an author of content that is relevant to a topic of interest to a user, the method comprising:

receiving, by one or more processors at a first computing system, multiple pieces of content that previously have been published in one or more different media outlets;

storing, within a computer memory storage system, at least portions of the received pieces of content that previously have been published;

for at least a particular one of the received pieces of content that previously was published, identifying an author of the particular piece of content, wherein identifying an author of the particular piece of content includes identifying a byline for the particular piece of content that specifies the author of the particular piece of content and a media outlet within which the particular piece of content appeared;

accessing contact information for each of multiple authors;

as a consequence of accessing the contact information for the multiple authors, determining that contact information corresponding to the author of the particular piece of content is included within the accessed contact information;

in response to determining that contact information corresponding to the author of the particular piece of content is included within the accessed contact information, establishing a relationship between the particular piece of content and the contact information corresponding to the author of the particular piece of content, wherein establishing a relationship between the particular piece of content and the contact information for the author of the particular piece of content includes creating a database entry that links the byline for the particular piece of content to the contact information for the author of the particular piece of content;

receiving, at the first computing system and from a second computing system that is distinct from the first computing system, an indication of a topic of interest to a user;

accessing, from the computer memory storage system, at least some of the stored portions of the pieces of content that previously have been published;

in response to receiving the indication of the topic of interest, comparing the indication of the topic of interest to the accessed portions of the pieces of content that previously have been published;

based on results of comparing the indication of the topic of interest to the accessed portions of the pieces of content that previously have been published, identifying the particular piece of content as being relevant to the topic of interest;

in response to identifying the particular piece of content as being relevant to the topic of interest and as a consequence of the established relationship between the particular piece of content and the contact information corresponding to the author of the particular piece of content, identifying the contact information corresponding to the author of the particular piece of content, wherein identifying the contact information for the author of the particular piece of content as a consequence of the established relationship between the particular piece of content and the contact information for the author of the particular piece of content includes:

accessing the database entry that links the byline for the particular piece of content to the contact information for the author of the particular piece of content, and identifying the contact information for the author of the particular piece of content based on having accessed the database entry that links the byline for the particular piece of content to the contact information for the author of the particular piece of content; and returning, to the second computing system, an indication of the identity of the author of the particular piece of content and at least some of the identified contact information corresponding to the author of the particular piece of content.

15. The method of claim 14 further comprising:

returning, to the second computing system, an indication of the particular piece of content identified as being relevant to the topic of interest;

in response to returning, to the second computing system, the indication of the particular piece of content identified as being relevant to the topic of interest, receiving, from the second computing system, a request for the particular piece of content identified as being relevant to the topic of interest; and in response to receiving the request for the particular piece of content identified as being relevant to the topic of interest, returning, to the second computing system, at least a portion of the particular piece of content identified as being relevant to the topic of interest.

16. The method of claim 14 wherein:

storing, within the computer memory storage system, at least portions of the received pieces of content that previously have been published includes indexing the portions of the received pieces of content that previously have been published;

comparing the indication of the topic of interest to the accessed portions of the pieces of content that previously have been published includes comparing the topic of interest to the index of the portions of the pieces of content that previously have been published; and identifying the particular piece of content as being relevant to the topic of interest based on results of comparing the indication of the topic of interest to the accessed portions of the pieces of content that previously have been published includes identifying the particular piece of content as being relevant to the topic of interest based on results of comparing the indication of the topic of interest to the index of the portions of the pieces of content that previously have been published.

17. The method of claim 14 wherein:
identifying an author of the particular piece of content includes identifying a byline for the particular piece of content that specifies an author of the particular piece of content and a media outlet within which the particular piece of content appeared;
establishing a relationship between the particular piece of content and the contact information for the author of the particular piece of content includes establishing a relationship between the byline for the particular piece of content and the contact information for the author of the particular piece of content; and
identifying the contact information for the author of the particular piece of content as a consequence of the established relationship between the particular piece of content and the contact information for the author of the particular piece of content includes identifying the contact information for the author of the particular piece of content as a consequence of the established relationship between the byline for the particular piece of content and the contact information for the author of the particular piece of content.

18. The method of claim 17 wherein:
determining that contact information for the author of the particular piece of content is included within the accessed contact information includes determining that contact information at another media outlet for the author of the particular piece of content is included within the accessed contact information, the other media outlet being different from the media outlet within which the particular piece of content appeared;
establishing a relationship between the particular piece of content and the byline for the particular piece of content includes establishing a relationship between the byline for the particular piece of content and the contact information for the author at the other media outlet that is different from the media outlet within which the particular piece of content appeared;
identifying the contact information for the author of the particular piece of content includes identifying the contact information for the author at the other media outlet that is different from the media outlet within which the particular piece of content appeared; and
returning, to the second computing system, at least some of the identified contact information for the author of the particular piece of content includes returning, to the second computing system, at least some of the identified contact information for the author at the other media outlet that is different from the media outlet within which the particular piece of content appeared.

19. A computer-implemented method for identifying contact information for an author of content that is relevant to a topic of interest to a user, the method comprising:
receiving, by one or more processors at a first computing system and from a second computing system that is distinct from the first computing system, an indication of a topic of interest to a user, wherein receiving, by one or more processors at the first computing system and from the second computing system, an indication of a topic of interest to a user includes receiving, by one or more processors at the first computing system and from the second computing system, at least a portion of a press release related to a promotional campaign;
accessing, from a computer memory storage system, multiple pieces of content;
in response to receiving the indication of the topic of interest, comparing the indication of the topic of interest to the multiple pieces of content accessed from the computer memory storage system, wherein comparing the indication of the topic of interest to the multiple pieces of content accessed from the computer memory storage system includes comparing the portion of the press release to the multiple pieces of content accessed from the computer memory storage system;
based on results of comparing the indication of the topic of interest to the multiple pieces of content accessed from the computer memory storage system, identifying a piece of content as being relevant to the topic of interest, wherein identifying a piece of content as being relevant to the topic of interest based on results of comparing the indication of the topic of interest to the multiple pieces of content accessed from the computer memory storage system includes identifying a piece of content as being relevant to the topic of interest based on results of comparing the portion of the press release to the multiple pieces of content accessed from the computer memory storage system;
in response to identifying the piece of content as being relevant to the topic of interest, identifying an identifier for an author of the piece of content identified as being relevant to the topic of interest;
accessing, from the computer memory storage system, contact information for each of multiple authors including identifiers therefor;
comparing the identifier for the author to the identifiers included in the accessed contact information;
based on results of comparing the identifier for the author to the identifiers included in the accessed contact information, identifying contact information corresponding to the author from within the accessed contact information; and
returning, to the second computing system, an indication of the identity of the author and at least some of the identified contact information corresponding to the author.

20. The method of claim 19 wherein:
identifying an identifier for the author of the piece of content identified as being relevant to the topic of interest includes identifying a byline for the piece of content, the byline specifying an identifier for the author of the piece of content and a first media outlet in which the piece of content appeared;
identifying contact information corresponding to the author from within the accessed contact information includes identifying contact information corresponding to the author that specifies that the author is affiliated with a second media outlet that is different than the first media outlet, the identified contact information corresponding to the author including contact information at the second media outlet corresponding the author;
returning, to the second computing system, at least some of the identified contact information corresponding to the author includes returning, to the second computing system, at least some of the identified contact information at the second media outlet corresponding to the author; and
the method further comprises:
returning, to the second computing system, an indication of the piece of content identified as being relevant to the topic of interest,
returning, to the second computing system, an indication that the piece of content identified as being relevant to the topic of interest appeared in the first media outlet, and returning, to the second computing system, an indication that the author is affiliated with the second media outlet.

21. The method of claim 19 wherein:

identifying a piece of content as being relevant to the topic of interest includes:
- identifying a first piece of content as being relevant to the topic of interest, and
- identifying a second piece of content as being relevant to the topic of interest, the second piece of content being different from the first piece of content;

the first piece of content identified as being relevant to the topic of interest includes a first byline specifying an identifier for the author of the first piece of content and a first media outlet in which the first piece of content appeared;

the second piece of content identified as being relevant to the topic of interest includes a second byline specifying an identifier for the author of the second piece of content and a second media outlet in which the second piece of content appeared, the second media outlet in which the second piece of content appeared being different from the first media outlet in which the first piece of content appeared, and the identifier for the author of the second piece of content being the same as the identifier for the author of the first piece of content;

identifying an identifier for the author of the piece of content identified as being relevant to the topic of interest includes:
- identifying a first unique identifier for the first byline for the first piece of content identified as being relevant to the topic of interest, and
- identifying a second unique identifier for the second byline for the second piece of content identified as being relevant to the topic of interest;

accessing, from a computer memory storage system, contact information for each of multiple authors includes accessing, from the computer memory storage system, database entries that link unique identifiers for bylines of individual pieces of content to corresponding contact information for the authors of the individual pieces of content;

comparing an identifier for the author to the identifiers included in the accessed contact information includes:
- comparing the first unique identifier for the first byline for the first piece of content identified as being relevant to the topic of interest to the unique identifiers for bylines within the accessed database entries, and
- comparing the second unique identifier for the second byline for the second piece of content identified as being relevant to the topic of interest to the unique identifiers for bylines within the accessed database entries;

identifying contact information corresponding to the author within the accessed contact information based on results of comparing the identifier for the author to the identifiers included in the accessed contact information includes:
- determining that the first unique identifier for the first byline for the first piece of content identified as being relevant to the topic of interest matches a first one of the unique identifiers for bylines included within the accessed database entries, the first unique identifier for bylines included within the accessed database entries being linked to contact information for a particular author,
- determining that the second unique identifier for the second byline for the second piece of content identified as being relevant to the topic of interest matches a second one of the unique identifiers for bylines included within the accessed database entries, the second unique identifier for bylines included in the accessed database entries being linked to the same contact information for the particular author, and
- identifying the contact information for the particular author that is linked to both the first and second unique identifiers for bylines included in the accessed database entries as contact information for the author.

\* \* \* \* \*